United States Patent [19]
Murakami

[11] Patent Number: 6,084,889
[45] Date of Patent: Jul. 4, 2000

[54] ATM MULTIPLEXING APPARATUS, ATM DEMULTIPLEXING APPARATUS, AND COMMUNICATION NETWORK WITH THE APPARATUS

[75] Inventor: Masaru Murakami, Yokohama, Japan

[73] Assignee: Hitachi, Ltd., Tokyo, Japan

[21] Appl. No.: 08/799,762

[22] Filed: Feb. 12, 1997

[30] Foreign Application Priority Data

Feb. 14, 1996 [JP] Japan .................................. 8-026435
Feb. 14, 1996 [JP] Japan .................................. 8-026436

[51] Int. Cl.$^7$ ...................................................... H04J 3/24
[52] U.S. Cl. ............................................. 370/474; 370/545
[58] Field of Search ..................................... 370/356, 373, 370/395, 474, 412, 416, 397, 352, 466, 399, 542, 535, 538, 539, 540, 541, 545

[56] References Cited

U.S. PATENT DOCUMENTS 5,260,978  11/1993  Fleischer et al. .
5,541,926   7/1996  Saito et al. ............................. 370/94.2
5,555,261   9/1996  Nakayama et al. ..................... 370/103
5,774,466   6/1998  Hamamoto et al. .................... 370/416

FOREIGN PATENT DOCUMENTS 7-321819   8/1995  Japan .
7-264214  10/1995  Japan .
 7264214  10/1995  Japan .

OTHER PUBLICATIONS

"A study on ATM Cell Multiplexer—Development of ATM Cell Processor LSIs—" The Institute of Electronics, Information and Communication Engineers, SSE–94 1995–03.

Primary Examiner—Chi H. Pham
Assistant Examiner—Kim T. Nguyen
Attorney, Agent, or Firm—Antonelli, Terry, Stout & Kraus, LLP

[57] ABSTRACT

An ATM multiplexing apparatus receives a multiplexed signal obtained by multiplexing a plurality of signals, converts each of a plurality of signals to a predetermined ATM cell according to a kind of the signal, then multiplexes these ATM cells, and outputs the multiplexed ATM cells. The ATM multiplexing apparatus includes a discriminator for discriminating each of a plurality of signals on the multiplexed signal, and a cell multiplexing apparatus for converting each of a plurality of signals on the multiplexed signal directly to a predetermined ATM cell on the basis of the output of the discriminator and outputs a stream of multiplexed ATM cells. On the other hand, an ATM demultiplexing apparatus receives a multiplexed stream of ATM cells, converts each ATM cell to a signal, then conducts multiplexing processing on the signals so as to correspond to a signal kind, converts the signals to a multiplexed signal, and outputs the multiplexed signal. The ATM demultiplexing apparatus includes an ATM cell disassembler for taking out each of a plurality of signals and a time stamp, and a signal multiplexer for converting a plurality of signals supplied from the ATM cell disassembler directly to a multiplexed signal on the basis of the time stamp and outputs the multiplexed signal.

2 Claims, 16 Drawing Sheets

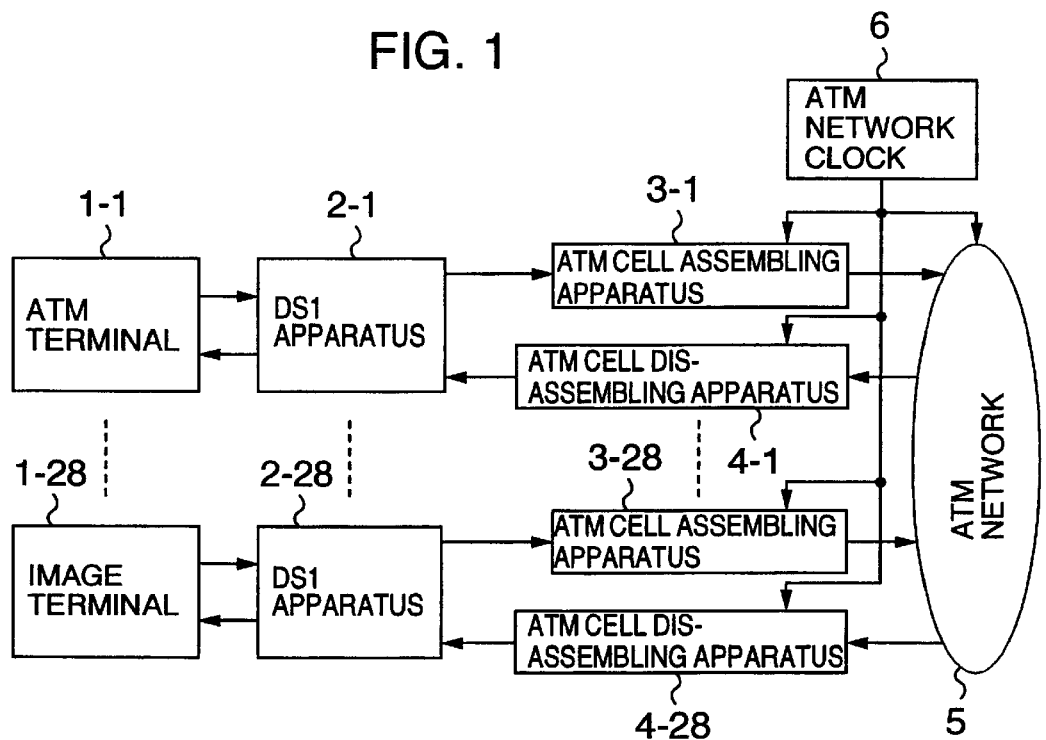
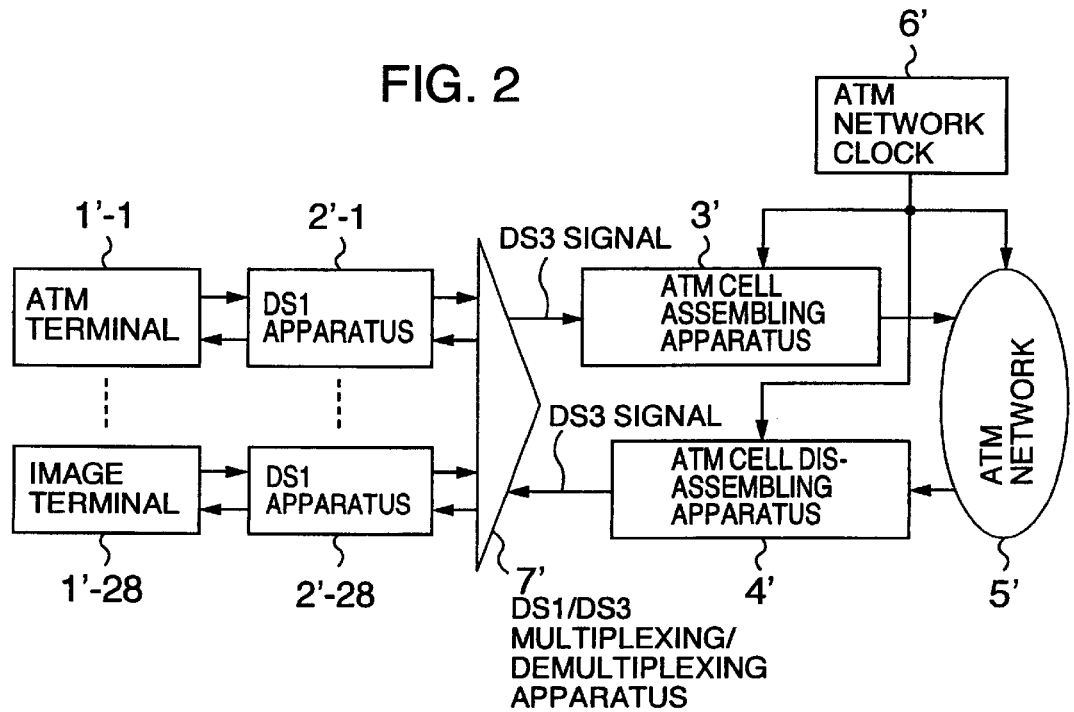

TIME →

| CHANNEL NUMBER | CONTENTS OF SERVICE | OUTPUT |
|---|---|---|
| 1 | ATM TERMINAL | 1 |
| 2 | IMAGE TERMINAL | 0 |
| 3 | ATM TERMINAL | 1 |
| 4 | IMAGE TERMINAL | 0 |

SERVICE TABLE
3'_5

ATM MULTIPLEXING APPARATUS, ATM DEMULTIPLEXING APPARATUS, AND COMMUNICATION NETWORK WITH THE APPARATUS

BACKGROUND OF THE INVENTION

1. Field of the Invention

The present invention relates to the configuration of an ATM multiplexing/demultiplexing apparatus for converting time division multiplexed signals to ATM cells or converting ATM cells to time division multiplexed signals, and relates to the configuration of an ATM communication network using those apparatuses.

2. Description of the Related Art

Introduction of communication apparatuses and communication networks using the asynchronous transfer mode (ATM) is under way in the form of interconnection between existing communication networks and replacement of communication networks. In such an introduction form, input/output signals of the ATM communication networks and communication apparatuses are existing signals such as DS1 signals of 1.544 MHz. In the ATM communication networks, the DS1 signals are converted to ATM cells to undergo processing such as transmission and exchange.

Even if signals at a source node such as a subscriber terminal are already ATM signals, signals inputted to an ATM communication network via an existing DS1 transmission line and a communication network arrive at the communication network in such a state that an ATM cell (53 bytes) of the source node is divided and inserted into payloads of a DS1 signal. In order to restore the ATM cell for processing, the ATM communication network includes a cell multiplexing apparatus as described in "Study on ATM cell multiplexing apparatus—development of ATM cell processor," Exchange System SSE-94, Technical Report, The Institute of Electronics, Information and Communication Engineers, and JP-A-7-321819. And cell synchronizing processing is conducted. In other words, a predetermined field (such as a header error control (HEC) field) contained in the header portion of an ATM signal taken out of a DS1 signal is detected and an ATM cell is regenerated. Furthermore, according to the configuration of the ATM communication network, ATM cells are multiplexed as occasion demands and are transmitted to the communication network.

On the other hand, in the case where conventional non-ATM signals such as audio signals supplied from a telephone terminal arrive at an ATM communication network, the non-ATM signals are converted there to ATM cells according to the classification of the signals as described in the aforementioned papers. Specifically, DS1 signals such as audio signals transferred and processed at a fixed bit rate are put into payloads of ATM cells according to the arrangement of AAL Type 1 (ATM Adaptation Layer Type 1) determined by the recommendation I. 363 of the International Telecommunication Union (ITU-T). In addition, predetermined headers are added. Thus the DS1 signals are converted to ATM cells. As occasion demands, ATM cells are multiplexed and transmitted to the communication network. By the way, in transmitting and receiving audio signals, synchronization of the signal rate at the source node and the destination node is important. In order to assure synchronization even if an asynchronous ATM communication network lies on the way, a concept called synchronous residual time stamp has been introduced in the above described recommendation. According to this concept, information relating to a frequency difference between the source node and the communication network (residual time stamp RTS) is inserted into ATM cells transferred in an ATM comunication network between the source node and the destination node. On the basis of this infomation, a clock synchronized to that of the source node is regenerated on the receiving side to assure synchronization. To be concrete, a P-bit counter having four bits is activated in the source node with an X-divided clock fox (2.43 MHz) obtained by applying frequency division to a clock fo (155.52 MHz) of the ATM network as described in U.S. Pat. No. 5,260,978. In addition, an N counter for conducting 3008 counts is stepped by using a clock fs (1.544 MHz) of a transmitted signal (DS1). Whenever, the N counter has counted the fs clock 3008 times, the output of the P-bit counter is outputted to the destination node as the RTS at a period equivalent to once every eight ATM cells. On the receiving desctination, an oscillator such as a voltage-controlled quartz-crystal oscillator is controlled on the basis of the RTS to regenerate a clock fr synchronized to the clock of the transmitting side.

If the scale of a network becomes large due to an increase of subscribers or the like in an existing communication network, signals transferred in the network are typically multiplexed and transmitted at a higher rate in order to reduce the cost of the network configuration. For example, a configuration as desribed in recommendation T1. 107 of the American National Standards Institute (ANSI) is known. In this configuration, four DS1 signals are stuff-multiplexed into one DS2 signal. Furthermore, seven DS2 signals are stuff-multiplexed into one DS3 signal. Twenty eight DS1 signals are thus multiplexed into one DS3 signal for transmission. In other words, in such a configuration that ATM communication networks are put in existing communication networks, input/output lines of the ATM communication networks carry in many cases DS3 signals instead of DS1 signals described above.

The above described convertion in the ATM communication network between ATM cells and signals is conducted on the assumption that signals are DS1 signals. In the case where multiplexed signals such as DS3 signals are inputted to/outputted from the ATM communication network, therefore, it becomes necessary to demultiplex a DS3 signal to DS1 signals on the input side temporarily and stuff-multiplex DS1 signals into a DS3 signal again on the output side. If a stuff multiplexing/demultiplexing apparatus such as a conventional D31 multiplexing/demultiplexing apparatus is simply introduced in a stage preceding or succeeding the ATM communication network, however, the hardware scale becomes large, resulting in impaired economical efficiency. In addition, a synchronizing method using the above described SRTS is adopted in the ATM communication network depending upon the property of the signal to be handled (such as the audio signal described before). Therefore, information relating to the stuff possessed by the DS3 signal inputted to the ATM communication network is terminated on the source side of the ATM communication network. In other words, this stuff information cannot be used when conducting multiplexing into the DS3 signal again on the distination side of the ATM communication network. As described above, therefore, the clock is regenerated so as to correspond to the DS1 signal on the basis of the RTS. By using this clock, new stuff synchronous multiplexing is conducted. Due to such a configuration, hardware such as an oscillator for regenerating the clock becomes necessary for each DS1, resulting in further impaired economical efficiency.

SUMMARY OF THE INVENTION

An object of the present invention is to provide an ATM communication apparatus for effecting conversion between signals and ATM cells at a higher rate without impairing the economical efficiency for each of a plurality of multiplexed signals, such as DS1 signals, contained in multiplexed signals accommodated in a situation of an increased degree of multiplicity in communication networks in order to solve the above described subjects. Furthermore, an object of the present invention is to provide an ATM communication network accommodating multiplexed signals having a high degree of multiplicity, in which a multiplexing/ demultiplexing apparatus for demultiplexing a multiplexed signal into signals of processing units once and multiplexing the signals again is not needed also when effecting conversion between respective multiplexed signals and ATM cells and effecting processing and an economical configuration is thus achieved.

To be concrete, an object of the present invention is to provide an ATM multiplexing apparatus for accomodating multiplexed signals and converting a plurality of multiplexed signals to ATM cells, respectively. Furthermore, an object of the present invention is to provide an ATM demultiplexing apparatus responsive to reception of ATM cells to execute conversion between cells and signals and generate multiplexed signals. And an object of the present invention is to provide an ATM communication network having a combined cofiguration of such an ATM multiplexing apparatus and a demultiplexing apparatus and having multiplexed signals as its input and output.

Furthermore, as for an ATM multiplexing apparatus, an object of the present invention is to provide an ATM multiplexing apparatus for executing conversion of a plurality of multiplexed signals respectively to ATM cells corresponding to characteristics of respective signals without demultiplexing multiplexed signals, and provide an ATM multiplexing apparatus for multiplexing the converted ATM cells and outputting them to an ATM communication network or another ATM communication apparatus. As for an ATM demultiplexing apparatus, an object of the present invention is to provide an ATM demultiplexing apparatus for executing conversion of received ATM cells to signals corresponding to the structure of the received cells and an ATM demultiplexing apparatus for converting a received train of cells to respective signals and outputting multiplexed signals.

To be more concrete, an object of the present invention is to provide an ATM multiplexing apparatus which accommodates a DS3 signal obtained by multiplexing a plurality of DS1 signals, executes, for a plurality of DS1 signals, cell delineation and signal-cell conversion corresponding to characteristics of the signals, and outputs resultant ATM cells to an ATM communication network. Furthermore, an object of the present invention is to provide an ATM multiplexing apparatus responsive to multiplexed DS1 signals being signals to be converted to cells according to prescriptions of the AAL type 1 to monitor DS3 signals, thereby generate time stamps using the SRTS method for every DS1 signal, insert the time stamps into ATM cells, and output resultant ATM cells.

And an object of the present invention is to provide an ATM demultiplexing apparatus for converting received ATM cells to DS1 signals and outputting DS3 multiplexed signals, in which stuff insertion control is effected by using time stamps in the SRTS method extracted from DS1 signals converted to cells and thereby DS3 multiplexed signals are generated and outputted.

Furthermore, in an ATM demultiplexing apparatus, the period of time stamps supplied by the SRTS method is longer than the stuff insertion interval of the case where stuff control is effected. Whenever a time stamp is received once, therefore, stuff insertion is conducted a plurality of times. Therefore, an object of the present invention is to provide a stuff pattern generation method suitable for this stuff control and provice a stuff control circuit.

In order to solve the above described subjects, an ATM multiplexing apparatus according to the present invention receives a multiplexed signal obtained by multiplexing a plurality of signals, converts each of a plurality of signals to a predetermined ATM cell according to a kind of the signal, multiplexes these ATM cells, and outputs the multiplexed ATM cells. The ATM multiplexing apparatus includes a discriminator for discriminating each of a plurality of signals on the multiplexed signal, and a cell multiplexing apparatus for converting each of a plurality of signals on the multiplexed signal directly to a predetermined ATM cell without separating it on the basis of output of the discriminator and outputting a stream of multiplexed ATM cells.

To be more concrete, the discriminator includes a synchronizing circuit for attaining frame synchronizing of the multiplexed signal, a discrimination signal generation circuit for monitoring output of the synchronizing circuit and generating signals indicating a location, a number, and a signal kind of each of a plurality of signals on the multiplexed signal. These discrimination signals are outputted to the cell multiplexing apparatus together with the multiplexed signal. Furthermore, the discrimination signal generation circuit of the discriminator includes a table for registering therein beforehand signal kinds of a plurality of signals existing on the multiplexed signal. A search is conducted on the table by using the output of the synchronizing circuit and thereby the discrimination signal is generated. Furthermore, the discriminator includes a circuit for generating respective time stamps of a plurality of signals existing on the multiplexed signal directly from the discrimination signal and the clock of the ATM network when genrating a time stamp indicating a frequency difference between respective clocks of a plurality of signals transferred in ATM cells and the clock of the ATM network. The time stamp is outputted to the cell multiplexing apparatus. A concrete time stamp generation circuit includes a first counter for counting passed bits of each of a plurality of signals existing on the multiplexed signal, a second counter for counting clock pulses of the ATM network, and a latch circuit for outputting output of the second counter obtained when the first counter has a predetermined value, as a time stamp of each of a plurality of signals.

A cell multiplexing apparatus includes a memory for storing the multiplexed signal, a memory control circuit, an ATM cell delineation circuit, an ATM cell assembler, and a table similar to the table included in the discriminator. When the multiplexed signal, the discrimination signal, and a time stamp are inputted, a plurality of signals existing on the multiplexed signal are stored in the memory on the basis of the discrimination signal. The ATM cell delineation processing or ATM cell assembly is conducted on data supplied from the memory so as to correspond to the signal kind. The generated ATM cells are outputted as a multiplexed cell stream. The ATM cell assembler inserts the inputted time stamps in the ATM cells according to the signal kind.

Furhtermore, an ATM demultiplexing apparatus receives a multiplexed ATM cell stream, converts each ATM cell to a signal, conducts multiplexing processing on the signals so as to correspond to the signal kind, converts the signals to a multiplexed signal. The ATM demultiplexing apparatus includes an ATM cell disassembler for taking out each of a plurality of signals and a time stamp from the ATM cell stream, and a signal multiplexer for converting a plurality of signals supplied from the ATM cell disassembler directly to the multiplexed signal on the basis of the time stamp and outputting the multiplexed signal.

To be more concrete, the signal multiplexer includes a memory for storing the data and the time stamp supplied from the cell disassembler, and a multiplexing controller for generating multiplexing control signals from the time stamp stored in the memory, adjusting the data readout rate, and inserting the multiplexing control signals and a plurality of signals in predetermined positions in a frame of the multiplexed signal. A multiplexed signal obtained by multiplexing a plurality of signals read out from the memory is outputted. Furthermore, the multiplexing control circuit includes a table for storing beforehand a plurality of patterns of the multiplexing control signals to be inserted in the multiplexed signal, a time stamp controller for generating a reference signal from the received time stamp and the clock of the ATM network, and a pattern controller for selecting one out of the patterns stored in the table on the basis of the reference signal and thereby adjusting the readout rate of the memory. The selected pattern and a plurality of signals are inserted in a frame of the multiplexed signal, and thereby synchronizing of each of a plurality of signals between a source node and a destination node is assured. Furthermore, the time stamp control circuit includes a time stamp generator for generating a time stamp from the clock of said ATM network and the number of bits of data read out from the memory, and a comparator for comparing the received time stamp with the output of the time stamp generator. The output of the comparator is outputted as the reference signal to be used by the pattern controller to adjust the data readout rate.

Furthermore, in accordance with the present invention, the above described ATM multiplexing apparatus and ATM demultiplexing apparatus are disposed at input and output ends of an ATM network, respectively. Even if a multiplexed signal obtained by multiplexing a plurality of signals is inputted/outputted, each signal can be converted to ATM cells in the ATM network without separating respective signals. Transmission and exchange can be conducted by taking a signal as the unit. Thus an ATM communication network which can be connected to a communication network using multiplexed signals or which can substitute for such a communication network has been formed.

BRIEF DESCRIPTION OF THE DRAWING

FIG. 1 is a network configuration diagram showning the configuration of the case where an ATM communication network has been introduced into an existing communication network;

FIG. 2 is a network configuration diagram showning the configuration of the case where an ATM communication network having an ATM communication apparatus of the present invention has been introduced into a multiplexed communication network;

DESCRIPTION OF THE PREFERRED EMBODIMENTS

Figure 3:
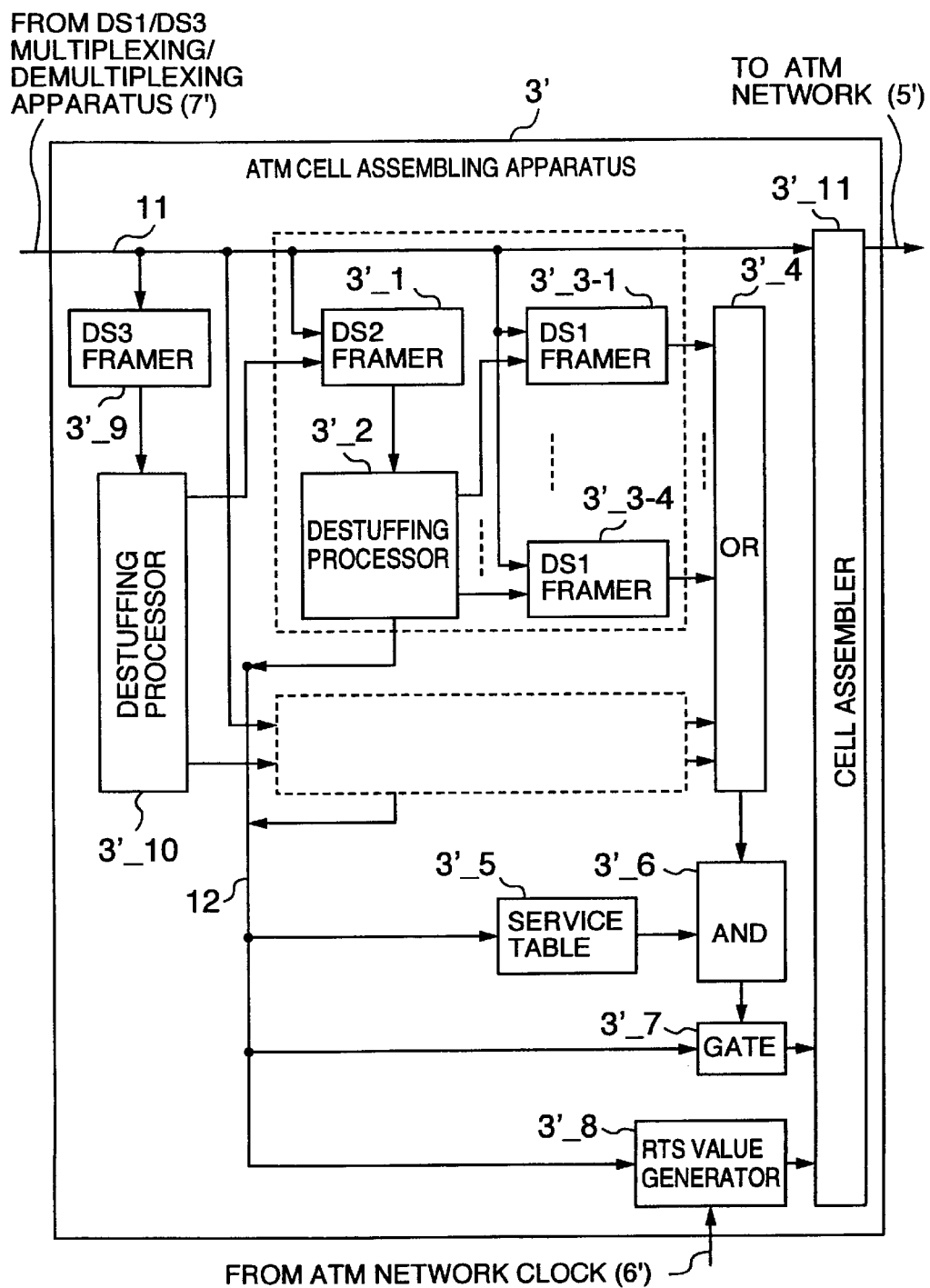
FIG. 3 is a block configuration diagram showing the configuration of an ATM cell assembling apparatus according to the present invention.

Hereafter, the configuration and operation of an ATM multiplexing apparatus (hereafter referred to as ATM cell assembling apparatus) and an ATM demultiplexing apparatus (hereafter referred to as ATM cell dis-assembling apparatus) according to the present invention, and an ATM communication network using these apparatuses will be described in detail by referring to drawing.

FIG. 1 is a diagram showing the network configuration of the case where an ATM communication network has been introduced into a communication network using existing DS1 transmission lines. As subscriber terminals, an ATM terminal 1-1 handling ATM signals through a conventional terminal (image terminal) 1-28 handling non-ATM signals are accommodated. Respective signals are transmitted to/received from the communication network via a DS1 apparatus 2. At input and output ends of an ATM network 5, an ATM cell assembling apparatus 3 and an ATM cell dis-assembling apparatus 4 are disposed, respectively. Conversion between respective signals and ATM cells as described with respect to the conventional technique is thus conducted. ATM cells are transmitted and exchanged in the ATM network 5 to conduct communication between terminals. The ATM cell assembling apparatus 3 may be integral with the ATM cell dis-assembling apparatus 4.

FIG. 2 is a diagram showing the network configuration of the case where an ATM communication network having an ATM cell assembling apparatus 3' and an ATM cell dis-assembling apparatus 4' according to the present invention has been introduced to a communication network using high-speed multiplexed transmission lines (DS3).

In the communication network of the present configuration, transmission lines of the existing network connected to the ATM communication network have been changed from DS1 transmission lines (1.544 MHz) to DS3 transmission lines (44.736 MHz). The ATM terminal 1'-1 through the image terminal 1'-28, and respective DS1 apparatuses 2'-1 through 2'-28 corresponding to respective terminals have the same configuration as those of FIG. 1 does. The operation does not change, either. In other words, the DS1 apparatus 2'-1 simply divides an ATM cell (including a head and a a payload) supplied from the ATM terminal 1'-1, puts it into a payload of a DS1 frame, and outputs a resultant DS1 signal onto a DS1 transmission line. The DS1 apparatus 2'-28 puts an image signal in a payload of a DS1 frame and outputs a resultant DS1 signal onto a DS1 transmission line.

In accordance with a multiplexing law stipulated in ANSI recommendation T1. 107, a DS3 multiplexing/demultiplexing apparatus 7' stuff-multiplexes four DS1 signals into one DS2 signal, then multiplexes seven DS2 signals into one DS3 signal, and outputs the resultant DS3 signal to the ATM cell assembling apparatus 3'. As described later with reference to FIG. 3, the ATM cell assembling apparatus 3' performs only discrimination of each of multiplexed DS1 signals without effecting separation, converts them to ATM cells according to property of each signal, and outputs resultant ATM cells to the ATM network 5'. This will now be described concretely. As for the DS1 apparatus handling signals supplied from an ATM terminal, only the payload of a DS1 signal is taken out except the overhead, the cell delineation which is to search the cell header and to regenerate a cell is effected and a resultant cell is outputted. As for the DS1 apparatus handling signals supplied from an image terminal, image information is information having a fixed bit rate in the same way as voice information. In accordance with the prescriptions stipulated by the AAL1, the DS1 signal itself containing an overhead is divided, and resultant divisions are put in payloads of ATM cells. The ATM cells are converted to ATM cells with predetermined headers containing time stamp RSTs using the SRTS method added. Resultant ATM cells are outputted. By the way, the ATM network 5' is activated by a clock of 155.52 MHz outputted by the ATM network clock 6'. Therefore, the ATM cell assembling apparatus 3' multiplexes ATM cells and outputs the multiplexed ATM cells.

On the contrary, the ATM cell dis-assembling apparatus 4' disassembles (decellulates) cell-multiplexed ATM cells supplied from the ATM network 5' to generate DS1 signals as described later with reference to FIG. 11. Unlike the conventional SRTS, the ATM cell dis-assembling apparatus 4' does not regenerate the clock of the DS1 signal from the received RTS, but generates stuffing bits directly from the RTS. And the ATM cell dis-assembling apparatus 4' conducts stuffing multiplexing directly by using stuffing bits which have generated DS1 signals and transfers resultant signals to the DS1/DS3 multiplexing/demultiplexing apparatus 7' as the DS3 signal. In the DS1/DS3 multiplexing/demultiplexing apparatus 7', DS1 signals are separated by a procedure opposite to that of the source side and resultant signals are outputted to the ATM terminal 1'-1 through the image terminal 1'-28 via the DS1 apparatuses 2'-1 through 2'-28.

The ATM cell assembling apparatus and the ATM cell dis-assembling apparatus according to the present invention and the ATM communication network using them has the following features. Multiplexed transmission lines such as DS3 transmission lines carrying a plurality of DS1 signals stuffing-multiplexed are connected as the input and output. Multiplexed signals once subjected to stuffing multiplexing are not demultiplexed one by one, but treated in the state of multiplexed signals. ATM cell assembling/dis-assembling is conducted so as to correspond to each DS1 signal. In order to make the description of the configuration and operation of respective apparatuses according to the present invention easily understandable, a frame structure of multiplexed signals which is the most important for implementing the present invention, i.e., the frame structure of the DS2 signal (structure for effecting DS1/DS2 stuffing synchronization) will be hereafter described. Multiplexing/demultiplexing for DS2/DS3 is also conducted in the same way.

Figure 4:
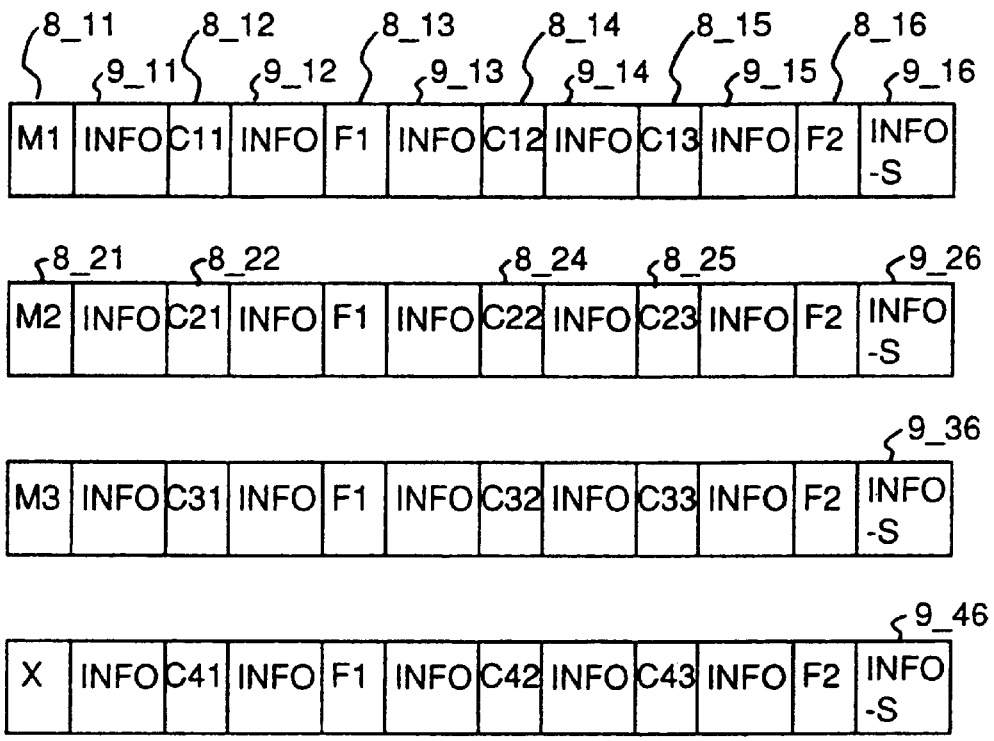
FIG. 4 is a signal configuration diagram showing frame structures of multiplexed signals.
Figure 5:
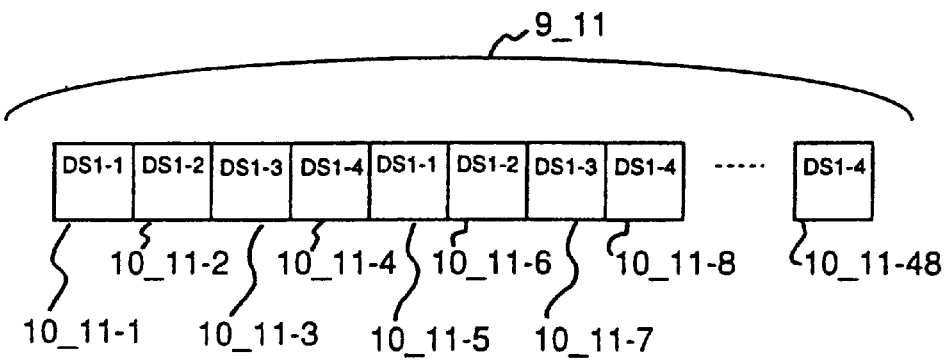
FIG. 5 is a signal configuration diagram showing the structure of a payload of a multiplexed signal.
Figure 6:
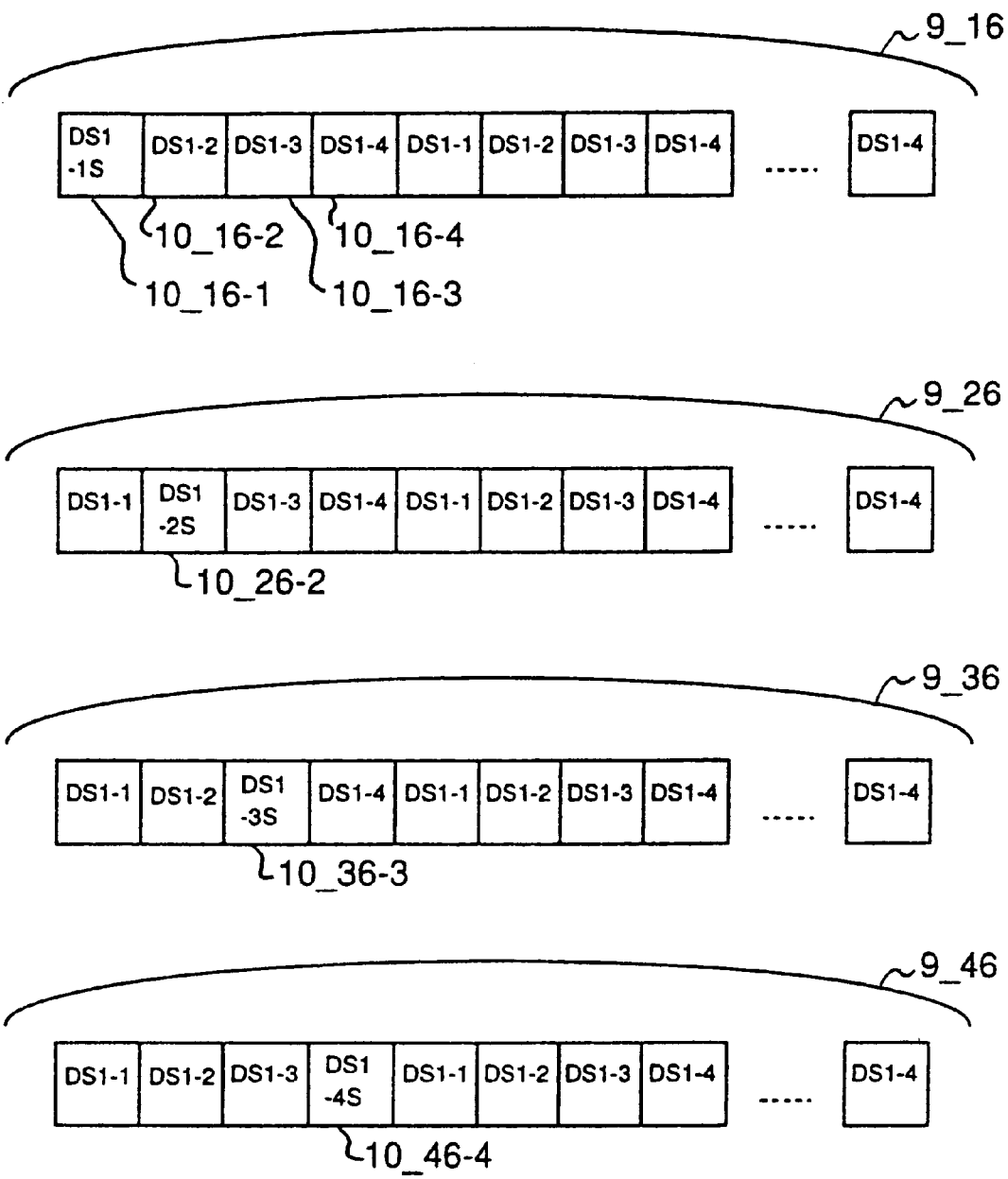
FIG. 6 is a signal configuration diagram showing the structure of a payload which conducts stuffing processing as well.

FIG. 4 is a signal structure diagram showing the frame structure of a DS2 signal. A DS2 signal is formed by multiplexing four DS1 signals. The DS2 signal is formed by twenty payloads INFO (9-11 through 9-15), payloads INFO-S (9-16, 9-26, 9-36 and 9-46), and twenty-four overhead bits (M1(8-11), C11(8-12), F1(8-13), C12(8-14), ... ). Each of the twenty payloads has 48 bits. When DS1 signals are multiplexed, stuffing bits corresponding to a DS1 signal can also be inserted into the payload INFO-S. (Hereafter, the DS1 signal is referred to as channel. In some cases, information identifying each channel is referred to as channel number.) Each of the twenty-four overhead bits has a single bit and incorporates monitoring control information of the DS2 signal such as information (C bit) indicating whether a stuffing bit is present in the above described payload. FIG. 5 is a signal structure diagram showing the structure of a typical payload INFO which does not incorporate a stuffing bit. In the case where four DS1 signals respectively having channel numbers 1 through 4 are multiplexed into a payload of a DS2 signal, a bit of channel 1 is placed in a time slot 10-11-1, a bit of channel 2 is placed in a time slot 10-11-2, and then a bit of channel 3 is placed in a time slot 10-11-3 as shown in FIG. 5. Thereafter, a bit of channel 4 is placed in a time slot 10-11-4, and a bit of channel 1 is placed again in a time slot 10-11-5. In this way, bits are multiplexed in the order of channel number bit by bit. FIG. 6 is a signal structure diagram showing the structure of a payload INFO-S which incorporates stuffing bits for stuffing multiplexing. In this payload as well, bits of DS1 signals are multiplexed in the same way as ordinary payloads INFO. As shown in FIG. 6, however, time slot 10-16-1 of payload 9-16, time slot 10-26-2 of payload 9-26, time slot 10-36-3 of payload 9-36, and time slot 10-46-4 of payload 9-46 are time slots in which stuffings of DS1 signals of channel numbers 1 through 4 can be inserted. When a stuffing has been inserted, an original DS1 signal which should be placed in that bit is made ineffective. When a stuffing has been inserted, "1" is indicated in overhead bits C11 8-12, C12 8-14, and C13 8-15 corresponding to respective channel numbers. Therefore, it is possible to know the stuffing multiplexing state of each channel.

FIG. 3 is a block configuration diagram showing the configuration of the ATM cell assembling apparatus 3'. A DS3 signal obtained by multiplexing DS1 signals is inputted to the ATM cell assembling apparatus 3' of the present invention. The ATM cell assembling apparatus 3' discriminates the DS1 signals, converts them to ATM cells without separating them, multiplexes the ATM cells, and outputs the multiplexed ATM cells to the ATM network. The ATM cell assembling apparatus 3' includes a discriminator and a cell assembler 3'-11. The discriminator monitors the DS3 signal, detects respective DS1 signals included in the DS3 signal, and orders and controls the ATM cell assembling processing (cell delineation or cell assembly using the AAL1) of the detected DS1 signal. The cell assembler 3'-11 actually generates cells and multiplexes those cells. And the discriminator includes a detection circuit and a control circuit. The detection circuit includes a DS3 framer 3'-9, a destuffing processor 3'-10, and seven sets, each set consisting of DS2 framer 3'-1, a destuffing processer 3'-2, and four DS1 framers 3'-3-1 through 3'-3-4. The DS3 framer 3'-9 first detects a DS2 signal from a DS3 signal propagated on a line 11. The seven sets detect a DS1 signal and its overhead. The control circuit includes an OR circuit 3'-4, an AND circuit 3'-6, a gate 3'-7, a service table 3'-5, and an RST value generator 3'-8. The OR circuit 3'-4, the AND circuit 3'-6, and the gate 3'-7 produce a control signal for cell generation so as to correspond to a DS1 signal on the basis of the result detected by the detection circuit. The service table 3'-5 stores properties of respective DS1 signals included in a DS3 signal beforehand. The RST value generator 3'-8 generates a time stamp on the basis of the result of signal detection.

Figures 7, 8:
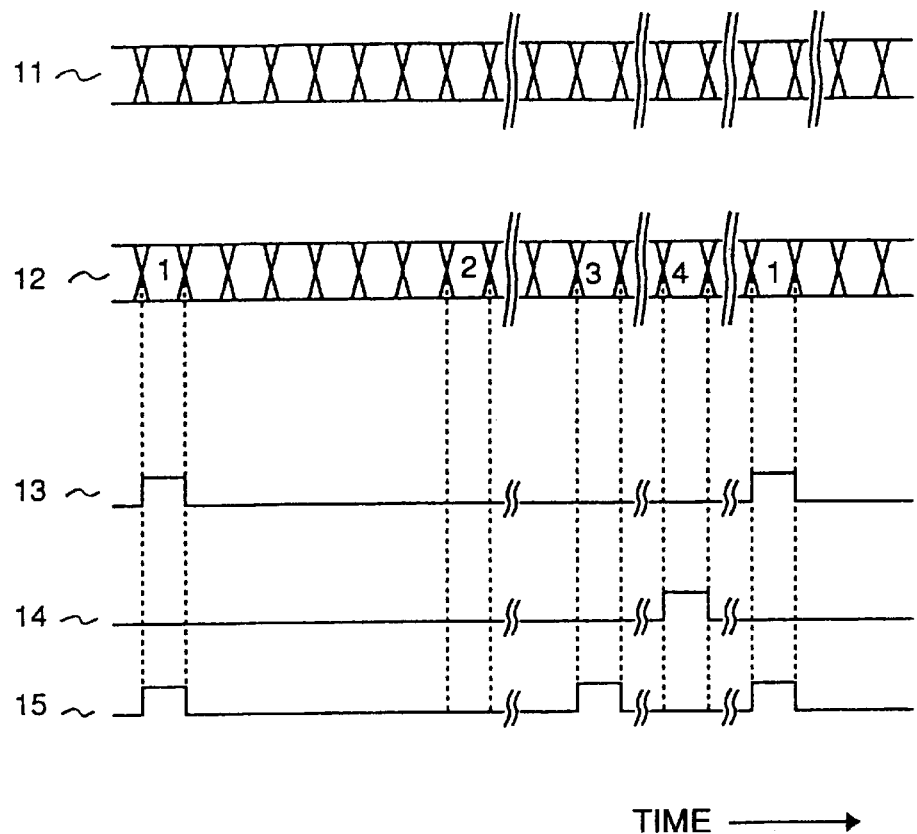
FIG. 7 is a timing diagram showing an operation of an ATM cell assembling apparatus according to the present invention.
FIG. 8 is a table configuration diagram showing the configuration of a service table included in the ATM cell assembling apparatus according to the present invention.

FIG. 7 is a timing diagram illustrating the operation of the ATM cell assembling apparatus 3'. FIG. 8 is a table configuration diagram showing the configuration of the service table 3'-5. Hereafter, the operation of the ATM cell assembling apparatus 3' according to the present invention will be described by referring to FIGS. 7 and 8.

The DS3 framer 3'-9 monitors the DS3 signal 11 and conducts frame synchnization processing to detect the position of the payload (having bit-multiplexed DS2 signals) and the overhead value of the DS3 signal. On the basis of a result detected by the DS3 framer 3'-9, the destuffing processor 3'-10 transmits information required to detect the DS1 signal to a DS2 framer 3'-1 corresponding to the detected DS2 signal. To be concrete, the destuffing processor 3'-10 notifies each DS2 framer 3'-1 of timing whereat a DS2 signal is present on the DS3 signal 11.

In the same way as the DS3 framer 3'-9, the DS2 framer 3'-1 monitors a DS2 signal on the DS3 signal 11 and conducts frame synchnization processing of the DS2 signal to detect the position of the payload (having bit-multiplexed DS1 signals as shown in FIGS. 5 and 6) and the overhead value. On the basis of a result detected by the DS2 framer 3'-1, the destuffing processor 3'-2 analyzes the stuff insertion situation conducted at the time of multiplexing DS1 signals into a DS2 signal at the source node of the DS3 signal 11 and analyzes the multiplexing structure of each DS1 signal. The destuffing processor 3'-2 then notifies the DS1 framers 3'-3-1 through 3'-3-4 corresponding to detected DS1 signals of presence timing of respective DS1 signals. Signals 13 and 14 illustrated in FIG. 7 show a notice signal for the DS1 framer 3'-3-1 corresponding to the channel 1 and a notice signal for the DS1 framer 3'-3-4 corresponding to the channel 4, respectively. The destuffing processor 3'-2 generates a channel number signal 12 (FIG. 7) for giving a notice of the channel number of the DS1 signal detected by the DS2 framer 3'-1 and outputs it to the service table 3'-5 and the RTS value generator 3'-8. This channel number signal 12 has repeated values such as "1", "2", "3", "4", and "1" so as to correspond to the presence of respective DS1 signals on the DS3 signal 11. On the DS3 signal 11, overhead bits of DS2 frames (one bit every 49 bits as shown in FIG. 4) and stuffing bits put in by making a part of the DS1 signals ineffective have already been inserted. In other words, there occurs a time period having no DS1 signals. The destuffing processor 3'-2 puts a value other than "1" through "4" in the channel number signal 12 of this time period.

On the basis of the signal notified of by the destuffing processor 3'-2, the DS1 framers 3'-3-1 through 3'-3-4 processes DS1 signals on the DS3 signal 11. To be concrete, the DS1 framers 3'-3-1 through 3'-3-4 conduct frame synchronization processing of DS1 signals and detect overheads of the DS1 signals in the same way other framers and notifies the control circuit (OR circuit 3'-4) of the position of the overhead on the DS3 signal 11.

In the ATM cell assembling apparatus 3', a plurality of DS1 signals are handled. When an ATM cell is generated so as to correspond to the classification of a signal accommodated in each DS1 signal, however, processing of DS1 overheads is different. Therefore, classification of each DS1 signal is registered in the service table 3'-5 shown in FIG. 8. When each DS1 signal on the DS3 signal 11 is converted to cells, cell conversion control of each DS1 signal is conducted by referring to the present table. To be concrete, the channel number and the kind of a signal accommodated in that channel are registered. In response to input of the channel number signal 12, a control signal for cell conversion represented by a signal 15 in FIG. 7 is outputted. In the present embodiment, "1" is assigned to channel numbers (1 and 3) accommodating signals of ATM terminals and the control circuit is activated so that the cell assembler 3'-11 will handle only the payload portion with the overhead of the DS1 signal excepted and conduct cell delineation. Furthermore, "0" is assigned to channel numbers (2 and 4) accommodating image terminals and the control circuit is activated so that the cell assembler 3'-11 will convert every signal including the overhead and payload of the DS1 signal inclusive of the time stamp outputted from the RTS value generator 3'-8 into cells in accordance with the prescription of the AAL1. By the way, setting of the present table is executed so as to correspond to the configuration of the communication network by a network management apparatus or the like (not illustrated).

In the ATM cell assembling apparatus 3' of the present invention, each DS1 signal is stored temporarily in a memory included in the cell assembler 3'-11 and readout operation is conducted DS1 signal by DS1 signal. Thereby the above described two kinds of cell conversion processing are conducted. (Details thereof will be described later by referring to FIG. 10.) As hereafter described, therefore, the control circuit included in the discriminator generates a control signal for determining whether an overhead for each DS1 signal should be written into the memory and outputs the control signal to the cell assembler 3'-11.

The OR circuit 3'-4 puts once together positional information pieces of overheads of DS1 signals on the DS3 signal 11 outputted from respective DS1 framers. From the service table 3'-5, signal kinds of respective channels are outputted so as to correspond to the channel number signal 12 as described above. By deriving the AND condition of the output of the OR gate 3'-4 and the output of the service table 3'-5 in the AND circuit 3'-6, therefore, it is possible to notify of only the position of the overhead of a channel for which it is not necessary to write the overhead into the memory according to the signal kind (i.e., a channel for which the signal accommodated in a DS1 is a signal of an ATM terminal). In the present embodiment, overheads positions of the channels 1 and 3 on the DS3 signal 11 are derived. The gate 3'-7 combines the overhead position information supplied from the AND gate 3'-6 with the channel number signal 12 and outputs the cell conversion control signal to the cell assembler 3'-11. Alternatively, alteration of the output condition of the control circuit such as a reversal of contents of the table 3'-5 may be adopted. It is a matter of course that the ATM cell assembling according to the present invention can be executed even in such a configuration that the position information of an overhead to be written into the memory and the channel number signal 12 are thus outputted.

The configuration and operation of the RTS value generator 3'-8 according to the present invention will now be described. A conventional RTS value generator has such a configuration that every fixed period of a counter activated by the clock of the DS1 signal, the value of a counter activated by the network clock is latched and the latched value (frequency difference) is adopted as the RTS value. As described above, however, the ATM cell assembling apparatus 3' of the present invention has such a configuration that the DS3 signal is left as it is and DS1 signals contained in the DS3 signal are converted to ATM cells by time division processing in order to prevent the economic efficiency from being impaired. In the ATM cell assembling apparatus 3' of the present invention, therefore, a clock signal for each DS1 signal is not present. In the present invention, therefore, the number of passage bits of each DS1 signal can be counted when monitoring the DS3 signals. In the present invention, therefore, there is adopted such a configuration that the counter of the network is latched to generate the RTS value whenever the count of the counter has reached a fixed value.

Figure 9:
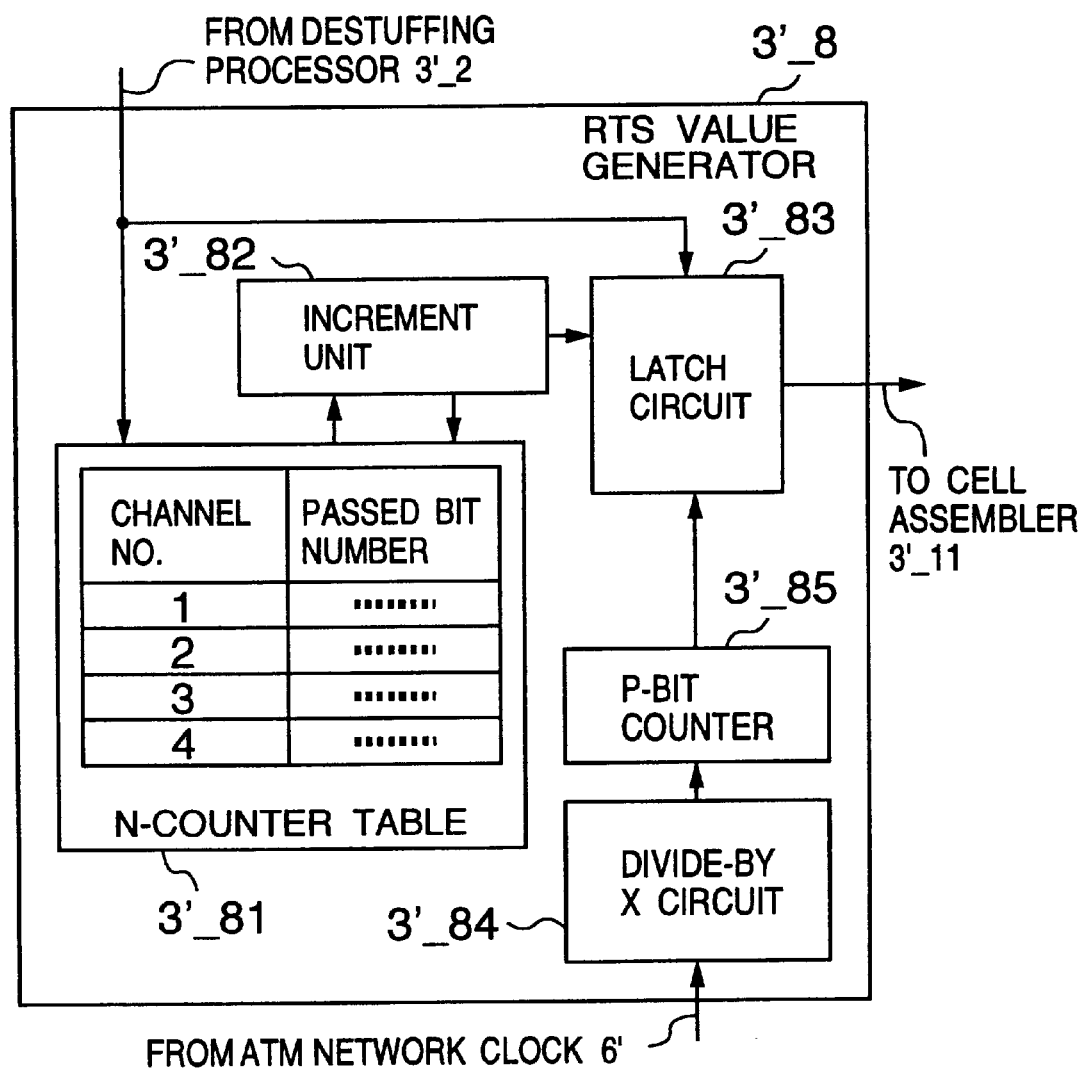
FIG. 9 is the block configuration diagram showing the configuration of an RTS value generator included in the ATM cell assembling apparatus according to the present invention.

FIG. 9 is a block configuration diagram showing the configuration of the RTS value generator. An N-counter table 3'-81 is a table for administering the number of bits of each DS1 signal passed on the DS3 signal 11 every channel. Specifically, the channel number signal 12 supplied from the destuffing processor 3'-2 is inputted to this N-counter table 3'-81. Passed bits of the DS1 signal for each channel are counted and administered by an increment unit 3'-82. A signal equivalent to the output of the N-counter of the conventional RTS generator is thus derived beforehand. According to the SRTS method, the RTS is generated every eight cells. In order to generate the RTS of the DS1 signal of 1.544 MHz, therefore, the increment unit 3'-82 counts up to 3008. Since the ATM network clock used in the present apparatus is 155.52 MHz, a divide-by X circuit 3'-84, a P-bit counter 3'-85 and a latch circuit 3'-83 have the same configuration as the conventional circuits. The output of the P-bit counter 3'-85 is latched by a latch signal outputted when the count of increment unit 3'-82 has reached. The latched value is adopted as the RTS. In addition, the increment unit 3'-82 transfers the number of signals and the channel number under counting as well to the cell assembler 3'-11.

Figure 10:
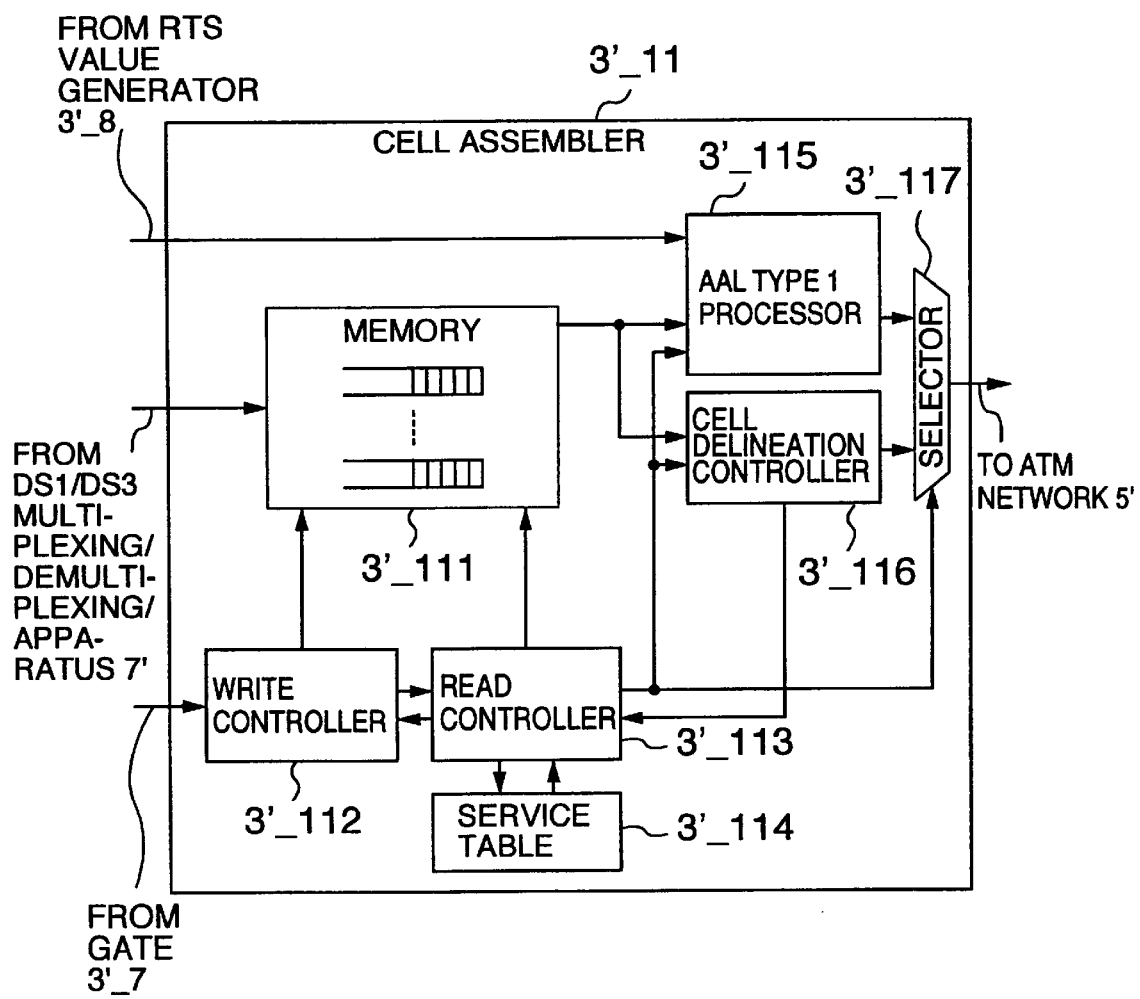
FIG. 10 is a block configuration diagram showing the configuration of a cell assembler included in the ATM cell assembling apparatus according to the present invention.

FIG. 10 is a block configuration diagram showing the configuration of the cell assembler. A memory 3'-111 of the cell assembler 3'-11 is a memory used for administering DS1 signals for respecevtive channel numbers. The memory 3'-111 is subjected to write and read control of FIFO type.

In a write controller 3'-112 and a read controller 3'-113, an address is stored for each channel number. Upon indication of a channel number from the gate 3'-7 included in the control circuit of the discriminator, the write controller 3'-112 transfers an address corresponding to the channel number to the memory 3'-111. Therefore, a DS1 signal on the DS3 signal 11 supplied from the DS1/DS3 multiplexing/demultiplexing apparatus 7' is written into a location of the memory 3'-111 corresponding to the channel number. In the case where an overhead location is notified of by the output of the gate 3'-7, the overhead signal located in the location is not used in the ATM cell conversion processing and consequently the write operation is not conducted as described before. After signal writing has been completed, a write address of a signal of the same channel number to be written subsequently is prepared.

The read controller 3'-113 notifies the write controller 3'-112 of the channel number of the data to be read out, receives the address of the memory storing the signal of the indicated channel number from the write controller 3'-112, and holds the address. This operation is conducted repeatedly. The address transferred from the write controller 3'-112 is compared with the address held in the read controller 3'-113. If data of one cell or more with respect to the signal of that channel number are judged to be in the memory 3'-111, signals of one cell are read out from the data of that channel stored in the memory 3'-111 and inputted to a cell delineation controller 3'-116 and an AAL type 1 processor 3'-115. Furthermore, to the read controller 3'-113, a service table 3'-114 storing the signal kind of each channel number of the signal to be read out in the same way as the service table 3'-5 included in the discriminator is connected. At the time of signal reading, contents of this table are also read out. If the signal is a signal supplied from an ATM terminal, a selector 3'-117 selects an ATM cell subjected to cell synchronizing processing and outputted from the cell delineation controller 3'-116. If the signal is a signal supplied from an image terminal, a selector 3'-117 selects an ATM cell outputted from the AAL type 1 processor 3'-115. Even if a DS3 signal is inputted to the present ATM cell assembling apparatus 3', ATM cell conversion of each DS1 signal is conducted without demultiplexing the DS3 signal into DS1 signals once and multiplexed ATM cells are outputted to the ATM network. As for the cell delineation controller 3'-116 and the AAL type 1 processor 3'-115, those having the configuration as described in "Study on ATM cell multiplexing apparatus-development of ATM cell processor," Exchange System SSE-94, Technical Report, The Institute of Electronics, Information and Communication Engineers, and JP-A-7-321819.

Hereafter, the configuration and operation of the ATM cell disassembling apparatus 4' according to the present invention will be described by referring to drawing.

Figure 11:
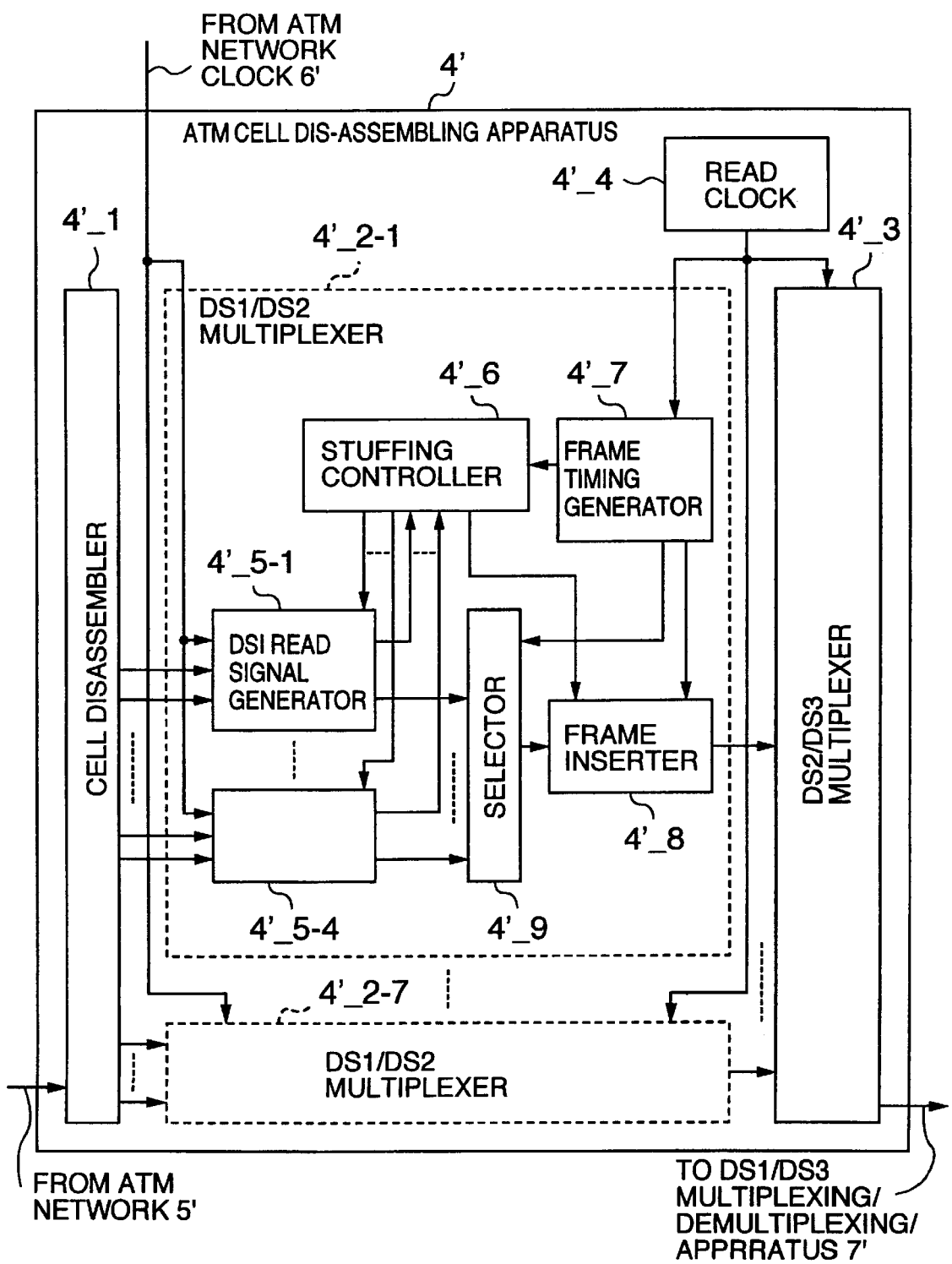
FIG. 11 is a block configuration diagram showing the configuration of an ATM cell dis-assembling apparatus according to the present invention.

FIG. 11 is a block configuration diagram showing the configuration of the ATM cell disassembling apparatus 4'. Upon receiving ATM cells corresponding to each DS1, the ATM cell dis-assembling apparatus 4' conducts predetermined ATM cell dis-assembly processing according to the kind of the DS1 signal, converts the disassembled signal to each DS1 signal, then conducts DS1/DS2 stuff multiplexing and DS2/DS3 multiplexing, and transmits a DS3 signal formed by multiplexing a plurality of DS1 signals. Specifically, the ATM cell dis-assembling apparatus 4' includes a cell disassembler 4'-1 for disassembling received ATM cells and converting them to DS1 signals, a DS1/DS2 multiplexer 4'-2-1, a DS2/DS3 multiplexer 4'-3, and a read clock 4'-4 for supplying an operation clock.

If the destination of the DS1 signal is an ATM terminal, it means that an ATM cell already subjected to header processing for ATM cell in the ATM network or the like have been received. Therefore, it is necessary for the cell disassembler 4'-1 to only divide this cell simply to produce a DS1 signal. On the other hand, if the destination of the DS1 signal of the ATM cell is an image terminal or the like and the DS1 signal has a fixed bit rate, the cell disassembler 4'-1 conducts cell disassembly based on the prescription of the AAL1 and regenerates the DS1 signal contained in the payload of the ATM cell. In other words, the cell disassembler 4'-1 disassembles the ATM cell into a payload, a header, and an RTS transmitted by using a part of the ATM cell. These disassembled signals are outputted to any one of the DS1 read signal signal generator 4'-5-1 through 4'-5-4 corresponding to the header.

The DS1/DS2 multiplexer 4'-2-1 conducts stuff-multiplexing on four DS1 signals supplied from the cell disassembler 4'-1, generates an overhead of a DS2 signal, and generates the DS2 signal. In the DS1/DS2 multiplexer 4'-2-1, a frame timing generator 4'-7 generates timing of a DS2 signal. In conformity with the timing thus generated, a frame inserter 4'-8 inserts a frame of the DS2 signal. A stuffing controller 4'-6 effects stuffing multiplexing control on DS1 signals, i.e., read control on the DS1 read signal generators 4'-5-1 and the like. In accordance with a directive given by the frame timing generator 4'-7, signals supplied from DS1 read signal generator are selected by a selector 4'-9. Thereby, a DS2 signal obtained by applying stuff multiplexing to DS1 signals is outputted. Each of the DS1/DS2 multiplexers 4'-2-1 through 4'-2-7 generates a DS2 signal by conducting the above described operation, and transfers each DS2 signal to the DS2/DS3 multiplexer 4'-3 in synchronism with the clock outputted by the read clock 4'-4. The DS2/DS3 multiplexer 4'-3 multiplexes DS2 signals to generate a DS3 signal. This DS3 signal is transmitted by an existing communication network, and demultiplexed into DS1 signals via the DS3/DS1 multiplexing/demultiplexing apparatus 7'. The DS1 signals arrive at subscriber terminals.

In the conventional stuff multiplexing of DS1 signals into a DS2 signal, the DS1 clock is compared with the DS2 clock and stuff bits are inserted to correct the clock difference. Therefore, if the conventional configuration of stuff multiplexing is used in an ATM cell dis-assembling apparatus connected to a communication network to which DS1 signals are sent via an ATM network and which transmits signals multiplexed into a DS3 signal, the clock of the DS1 signal is first regenerated on the basis of the received RTS value and the ATM network clock and thereafter stuff multiplexing is conducted, resulting in an impaired economic efficiency of the ATM communication apparatus. In the ATM cell dis-assembling apparatus 4' of the present invention, the DS1 clock is not regenerated on the basis of the RTS value and the ATM network clock, but a stuffing bit used for stuffing multiplexing is directly generated. By using the stuffing bit, control of stuffing insertion is effected. Laying stress on the configuration for generating this stuffing, therefore, the configuration and operation of the dis-assembling apparatus according to the present invention will be further described by referring to drawing.

Figure 12:
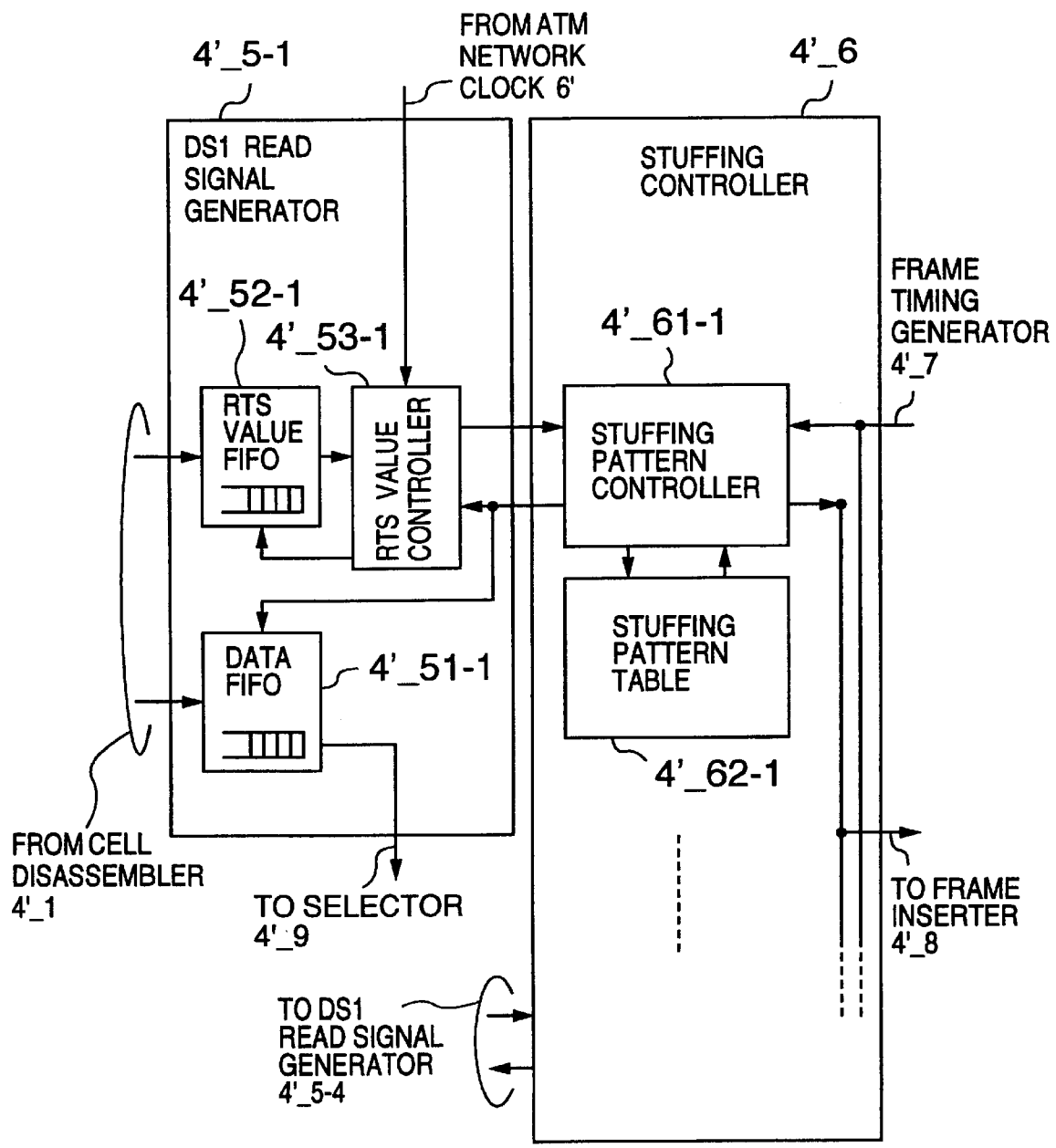
FIG. 12 is a block configuration diagram showing the configuration of a DS1 readout controller and a stuffing controller included in the ATM cell dis-assembling apparatus according to the present invention.

FIG. 12 is a block configuration diagram showing the configuration of the DS1 read signal generator 4'-5-1 and the stuffing controller 4'-6 included in the DS1/DS2 multiplexer 4'-2 which is in turn used in the dis-assembling apparatus 4' of the present invention. The stuffing controller 4'-6 shown in FIG. 12 outputs a read control signal to the DS1 read signal generator 4'-5-1 to read out a DS1 signal. DS1 signals are thus subjected to stuffing multiplexing.

The DS1 read signal generator 4'-5-1 includes a FIFO 4'-51-1 for storing the payload of an ATM cell supplied from the cell disassembler 4'-1, a FIFO 4'-52-1 for storing the RTS, and an RTS value controller 4'-53-1 for generating a control signal required for stuffing bit generation on the basis of the RTS and the internal clock of the apparatus. Specifically, a read control signal supplied from the stuffing controller 4'-6 is inputted to the RTS value controller 4'-53-1. Thereby, read rate information of the DS1 signal of the data FIFO 4'-51-1 is obtained. By using this information, the ATM network clock 6', and the RTS value read out from the RTS value FIFO 4'-52-1, therefore, a control signal for controlling the frequency of the stuffing bit generation and stuffing bit insertion in the stuffing controller 4'-6 is generated.

To be concrete, when the RTS value controller 4'-53-1 has judged the rate of the DS1 signal read out from the data FIFO 4'-51-1 by the read control signal supplied from the stuffing controller 4'-6 to be faster than the rate of the DS1 signal of the source node, the RTS value controller 4'-53-1 outputs a control signal to the stuffing controller 4'-6 in order to make the read rate of the data FIFO 4'-51-1 slower and increase the number of stuffing bits inserted at the time of multiplexing to DS2. In an opposite case, the read rate of the data FIFO 4'-51-1 is made faster and the number of stuffing bits inserted at the time of multiplexing to DS2. Such feedback control effected by transmitting and receiving the control signals between the RTS value controller 4'-53-1 and the stuffing controller 4'-6 is repeated. Thereby, the rate of the DS1 signals which is being read out is adjusted and stuffing bits are appropriately inserted. As a result, it becomes possible to regenerate the DS1 signal of the source node and multiplex DS1 signals to a DS2 signal at the rate of the present apparatus. In other words, frequency synchronizing between the transmission and reception of DS1 signals is attained.

Figure 13:
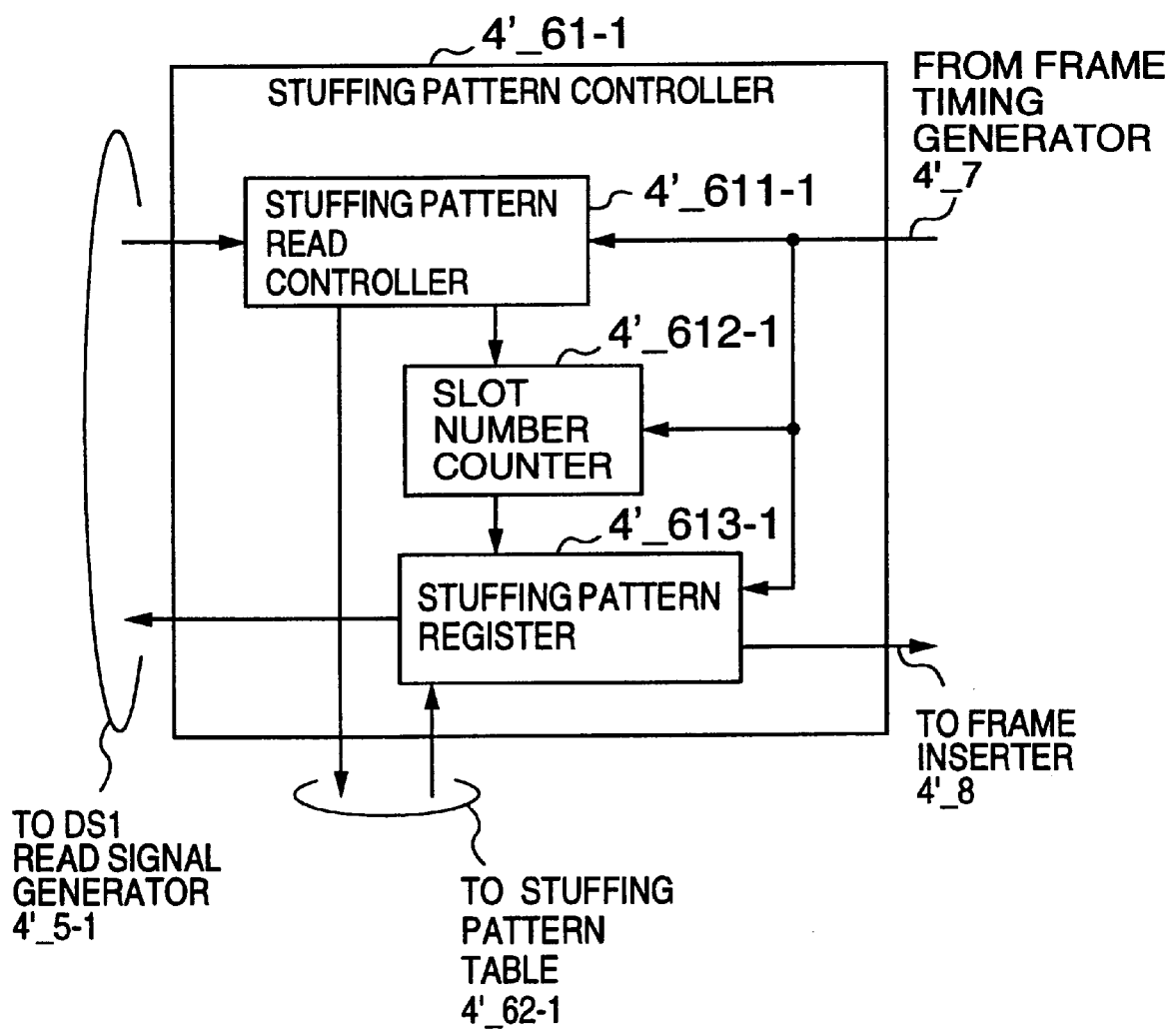
FIG. 13 is a block configuration diagram showing the configuration of a stuffing pattern controller included in the ATM cell dis-assembling apparatus according to the present invention.

FIG. 13 is a block configuration diagram showing the configuration of a stuffing pattern controller 4'-61-1 according to the present invention. Upon receiving the control signal from the RTS value controller 4'-53-1, the stuffing pattern controller 4'-61-1 selects an optimum stuffing bit pattern for stuffing multiplexing of DS1 signals from a stuffing pattern table 4'-62-1 which will be described later, outputs the DS1 signal read control signal to the data FIFO 4'-51-1 included in the DS1 read signal generator 4'-5-1, and effects stuffing bit insertion control according to the selected pattern.

Every eight ATM cells, one RTS value is generated and transferred as described above. On the other hand, bits can be inserted at the time of DS1/DS2 multiplexing at a rate of one bit every 288 bits in DS1 signal. Thus the supply period of the RTS value becomes longer than the stuffing insertion interval. Once a decision is made by using the RTS value, therefore, stuffing insertion bits for 3008/288 times, i.e., approximately eleven times must be derived. In accordance with the present invention, therefore, the stuffing pattern table 4'-62-1 for registering stuffing insertion patterns for eleven times therein is provided. The stuffing pattern controller 4'-61-1 selects an optimum pattern from this table. Stuffing multiplexing can be thus conducted without separately regenerating clocks corresponding to DS1 signals from the RTS.

Figure 14:
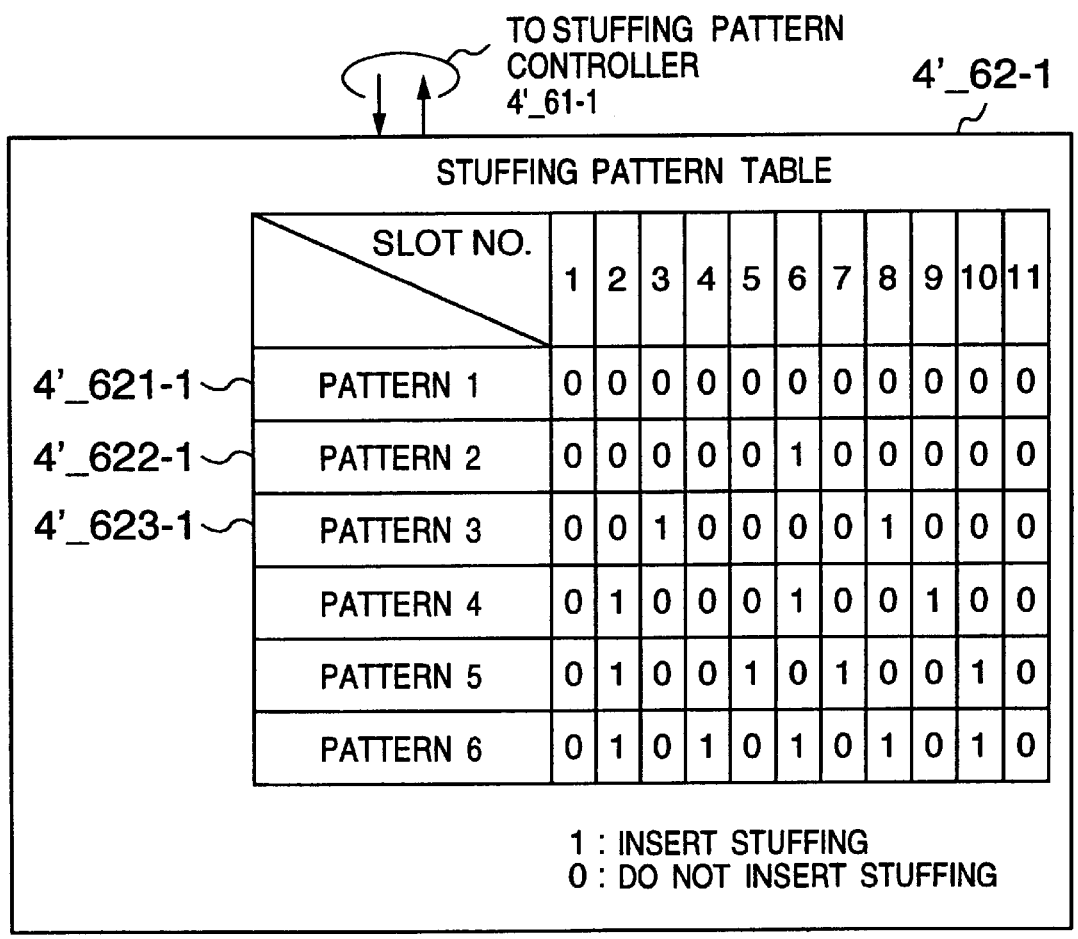
FIG. 14 is a block configuration diagram showing the configuration of a stuffing pattern table included in the ATM cell dis-assembling apparatus according to the present invention.

FIG. 14 is a table configuration diagram showing the configuration of the stuffing pattern table 4'-62-1. If the RTS has been received once, stuffing insertion control is effected eleven times. A pattern indicates whether stuffing bit insertion control should be effected every slot included in eleven slots. In order to change the pattern in response to the frequency synchronizing state, the present table has a plurality of patterns which are differnt in the number of inserted stuffing bits and insertion pattern. For example, when it is desired to quicken the read rate of DS1 signals, a pattern which is low in stuffing insertion frequency is chosen.

Upon receiving the control signal from the RTS value contoller 4'-53-1, a stuffing pattern read controller 4'-611-1 included in the stuffing pattern controller 4'-61-1 determines which stuffing pattern should be selected out of the stuffing pattern table 4'-62-1, reads the stuffing bit insertion pattern from the stuffing pattern table 4'-62-1, and stores it in a stuffing pattern register 4'-613-1. A slot number counter 4'-612-1 for administering eleven stuffing insertion positions and their order is activated to successively order insertion of stuffing bits of the pattern stored in the stuffing pattern register 4'-613-1 at timing of respective stuffing insertion positions. In the present embodiment, "1" in the table 4'-62-1 means that stuffing should be inserted whereas "0" means that stuffing should not be inserted. At the slot number indicated by the slot number counter 4'-612-1, it is thus controlled whether stuffing should be inserted or not. In response to whether stuffing should be inserted or not, the frame inserter 4'-8 controls the value of the DS2 frame overhead bit (C11 or the like) as well. In the case where a stuffing bit is inserted, the stuffing controller 4'-6 does not read data from the data FIFO 4'-51-1 in the stuffing insertion position.

Hereafter, the stuffing multiplexing operation (frequency synchronizing) in the ATM cell dis-assembling apparatus 4' according to the present invention will be described in further detail by referring to FIGS. 13 and 14. In pattern 2 (4'-622-1) illustrated in FIG. 14, stuffing bit insertion is conducted at slot number 6, i.e., only once. In pattern 3 (4'-623-1), stuffing bit insertion is conducted at slot numbers 3 and 8, i.e., twice. In other words, if the pattern 3 (4'-623-1) is selected, the number of stuffing bit insertion times increases and the amount of data read out from the data FIFO 4'-51-1 becomes less than that read out when the pattern 2 is selected.

For example, it is now assumed that the pattern 1 (4'-621-1) has been selected. If the RTS value controller 4'-53-1 has judged the rate of the DS1 signal read out from the data FIFO 4'-51-1 to be faster than the rate of the DS1 signal of the source node, the DS1 read signal controller 4'-5-1 outputs a control signal to make the read rate of the DS1 signal slower. On the basis of this control signal, the stuffing pattern controller 4'-61-1 selects the pattern 2 (4'-622-1) having higher stuffing bit insertion frequency and thereby makes the DS1 signal read rate slower. If an order is issued to make the DS1 signal read rate further slower, the pattern 3 (4'-623-1) having further higher stuffing insertion frequency is selected. By conducting such feedback control, the DS1 signal read rate can be made equal to the DS1 signal rate at the ATM cell assembling side. A method for selecting a stuffing pattern will now be described. For example, an integrator is provided in the stuffing pattern read controller 4'-611-1 to integrate the control signal supplied from the DS1 read signal controller 4'-5-1. If the integrated value is "1," the pattern 1 (4'-621-1) is selected. If the integrated value is "2," the pattern 2 (4'-622-1) is selected. When the integrated value has become "0" or less, the pattern 1 (4'-621-1) is selected. The stuffing pattern selection method is realized in such a configuration. Alternatively, the RTS value controller 4'-53-1 may be configured so that the control signal outputted by the RTS value controller 4'-53-1 will directly specify a pattern contained in the stuffing pattern table 4'-62-1. In this case, the pattern 1 is selected if the value of the control signal supplied from the DS1 read signal controller 4'-5-1 is "1." The pattern 2 is selected if the value of the control signal is "1."

Figure 15:
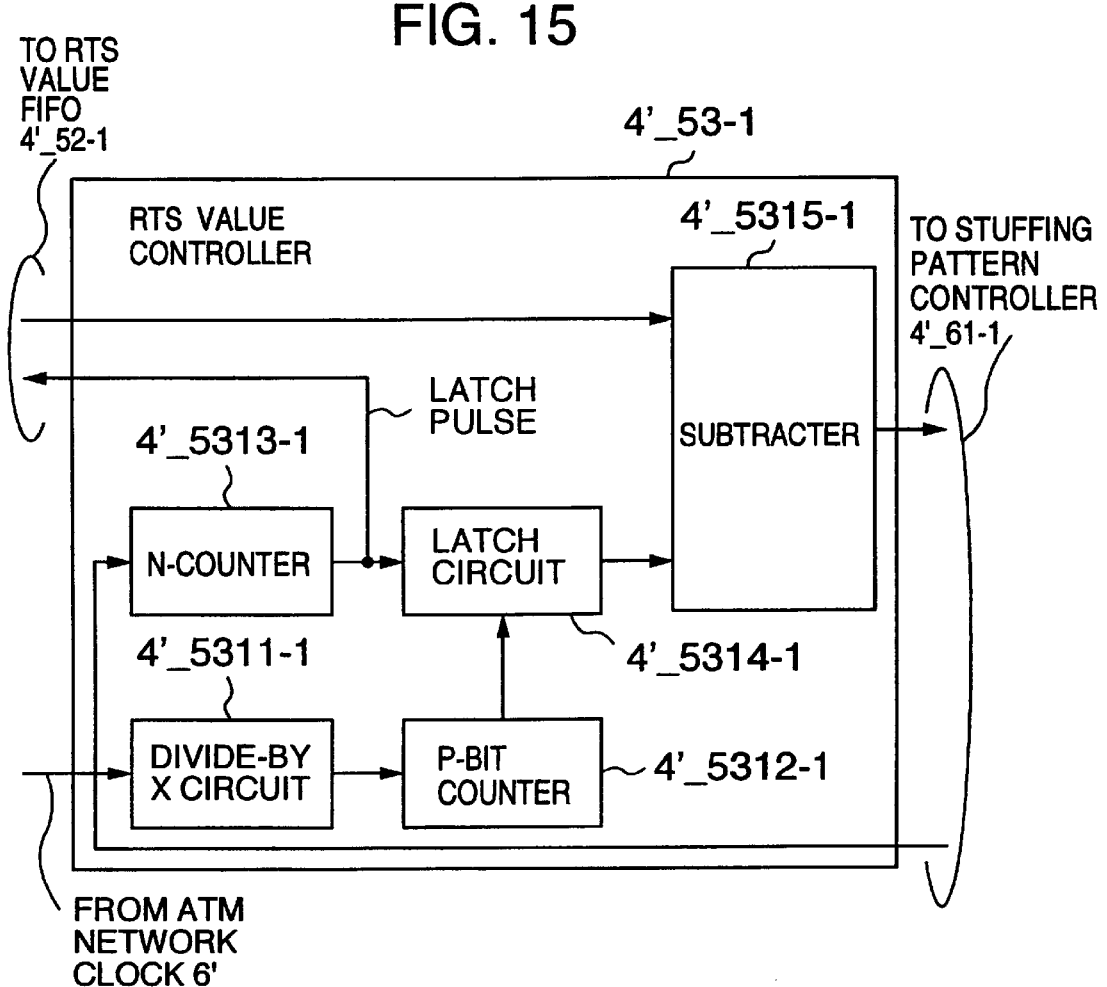
FIG. 15 is a block configuration diagram showing the configuration of an RTS value controller included in the ATM cell dis-assembling apparatus according to the present invention.

Hereafter, the configuration and operation of the RTS value controller for generating the control signal which in turn generates a stuffing bit on the basis of the RTS will be described. FIG. 15 is a block configuration diagram showing the configuration of the RTS value controller 4'-53-1 included in the ATM cell dis-assembling apparatus 4'.

The present RTS value controller 4'-53-1 includes an RTS producing circuit formed according to the same principle as the configuration for generating the RTS on the basis of the number of DS1 signal data described above with reference to the RTS value generator 3'-8 included in the ATM cell assembling apparatus 3'. With respect to the DS1 signal regenerated by the ATM cell dis-assembling apparatus, a new RTS value is generated. By comparing the generated RTS value with a received RTS value, a frequency difference is derived and stuffing synchronizing (frequency synchronizing) is executed. To be concrete, stuffing insertion control is effected so that the two kinds of RTS values will coincide with each other or the differnce will become constant, i.e. the frequency of the DS1 signal of the source node will be in synchronism with the frequency of the DS1 signal of the destination node.

A circuit for deriving the RTS by using the DS1 signal read out has a configuration similar to that of the RTS value generator 3'-8. A divide-by X circuit 4'-5311-1 divides the frequency of the ATM network clock 6' (155.52 MHz). In the case DS1 signals are handled, the output of the divide-by X circuit 4'-5311-1 becomes 2.43 MHz. A P-bit counter 4'-5312-1 which is a four-bit counter is driven by this 2.43 MHz clock. An N-counter 4'-5313-1 is a counter for counting the number of bits of the DS1 signal read out. The N-counter has a period of 3008 corresponding to the number of payload bits of eight ATM cells. A latch circuit 4'-5314-1 latches the value of the P-bit counter 4'-5312-1 at time intervals each equal to the period of the N-counter. The output of the latch circuit 4'-5314-1 becomes the RTS generated by using the DS1 signal read out. Then the received RTS read out from the RST value FIFO 4'-52-1 is compared in a subtracter 4'-5315-1 with the RTS value generated by the latch circuit 4'-5314-1. Thereby, a control signal representing information corresponding to the frequency difference between the DS1 signal of the source side and the DS1 signal of the destination side is produced and outputted to the stuffing pattern controller 4'-61-1. In the stuffing pattern controller 4'-61-1, a pattern is selected to effect stuffing control on the basis of a result obtained by integrating the signal supplied from the above described RTS value controller 4'-53-1. By repeating such feedback control, stuffing multiplexing of DS1 signals is conducted so that the output of the subtracter 4'-5315-1 will become "0" or a fixed value and consequently frequencies of both DS1 signals will coincide with each other.

Figure 16:
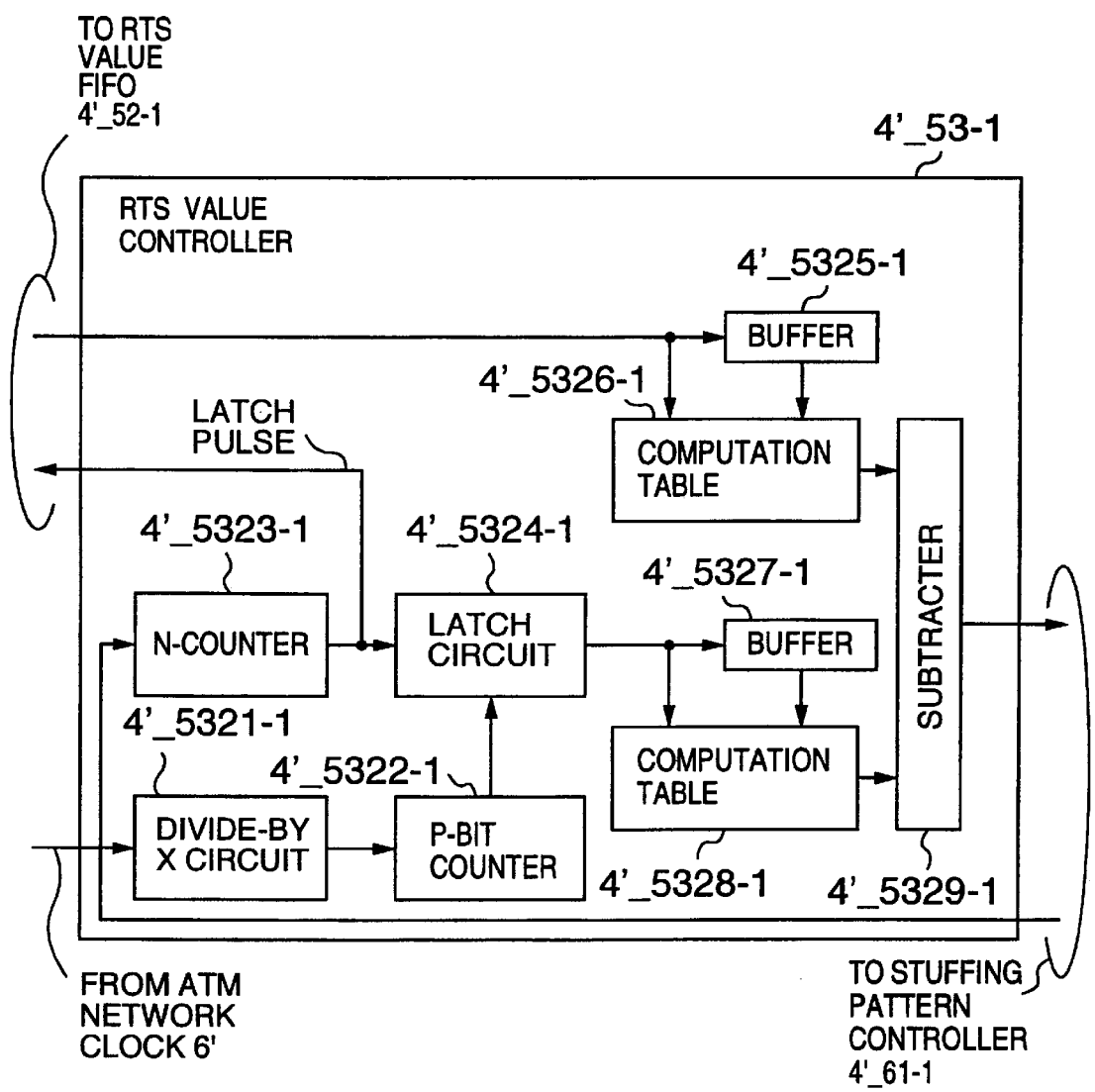
FIG. 16 is a block configuration diagram showing a different configuration of the RTS value controller included in the ATM cell dis-assembling apparatus according to the present invention.

FIG. 16 is a block configuration diagram showing a different configuration of the RTS value controller 4'-53-1. In the present controller as well, the RTS is generated by the DS1 signal of the destination side in the same way as the controllers described above. In order to improve the proof jitter of the DS1 signals and prevent data errors, the present controller computes how far the P-bit counter has operated on the basis of the last RTS and the current RTS, every RTS processing for both the received RTS and the RTS generated by the present controller. The present controller then compares the computed results with each other, and effects the stuffing insertion control on the basis of the result of the comparison.

A divide-by X circuit 4'-5321-1, a P-bit counter 4'-5322-1, an N-counter 4'-5323-1, and a latch circuit 4'-5324-1 are identical to the divide-by X circuit 4'-5311-1, the P-bit counter 4'-5312-1, the N-counter 4'-5313-1, and the latch circuit 4'-5314-1 shown in FIG. 15. The RTS read out from the RTS value FIFO 4'-52-1 is inputted to a buffer 4'-5325-1 and a computation table 4'-5326-1. In the computation table 4'-5326-1, a result of comparison computation between the RTS (current RTS) supplied from the RTS value FIFO 4'-52-1 and the RTS (immediately preceding RTS) supplied from the buffer 4'-5325-1 is derived.

Figure 17:
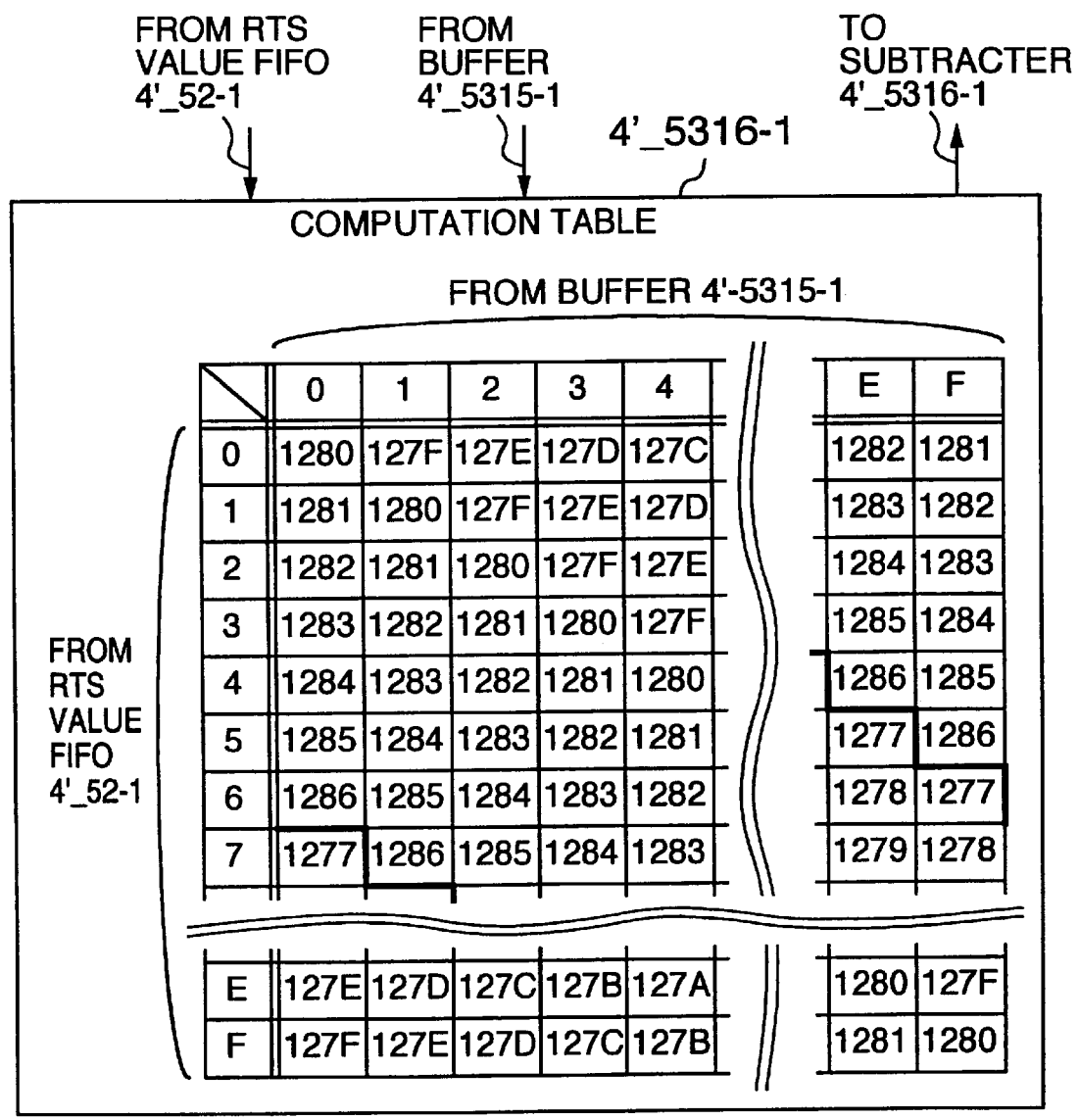
FIG. 17 is a table configuration diagram showing the configuration of a computation table included in the RTS value controller shown in FIG. 16.

FIG. 17 is a table configuration diagram showing the configuration of the computation table 4'-5326-1. Hereafter, the object and configuration of this table will be described. If the frequency of the DS1 signal is within a predetermined range, high-order bits of the counter counting the clock pulses at fixed time intervals always have the same value. Paying attention to this fact, the SRTS prescription defined by the ITU-T specifies that a counter (to which the four-bit P-bit counter corresponds) indicating only low-order bits of the counter which represents the fluctuations in a fixed frequency range should be provided and information RTS representing a frequency difference should be generated and transferred to allow the destination side to regenerate the clock of the original frequency. In actual lines, however, such a jitter or disturbance that the frequency exceeds the prescribed range might be caused. In this case, the premise of the SRTS prescription does not hold true. In the counting result of the actual counter, therefore, high-order bits omitted in transfer are also changed. Nevertheless, this information is not transmitted. As a result, the received RTS does not represent information concerning the correct frequency difference. In other words, there occurs a possibility of frequency synchronyzing being not attained. Even if disturbance does not often occur, it is desired to improve the situation by using a simple method in order to provide a high-quality communication. In accordance with the present invention, therefore, an obtained RTS value and an RTS value obtained the last time are inputted as shown in FIG. 17. A table storing counter values is produced so that the count value of the counter including values of high-order bits of the counter may be obtained. Even in the case where the disturbance is significant, therefore, information concerning the correct frequency difference is obtained by using the RTS. To be concrete, the interval for generating the RTS value is 3008 bits corresponding to payloads of eight ATM cells, and the clock of the counter for generating the RTS of the DS1 signal of 1.544 MHz is 2.43 MHz. Therefore, the number of clock pulses supplied to a counter for generating the RTS (corresponding to the P-bit counter) is approximately 4,734, which is (127E)h in hexadecimal notation. Hereafter, a numerical value in hexadecimal notation is enclosed in parentheses and is supplied with "h." On the other hand, the value of the RTS complying with the prescription is in the range of (0)h to (E)h. Therefore, values as shown in FIG. 17 are inputted beforehand so that a value arround the original accurate count value (127E)h may be obtained from the relations of preceding and succedding RTSs at the time of RTS receiving. This value is searched on the basis of the RTS and used for subsequent frequency control. By the way, the computation table 4'-5328-1 also has the same configuration as the computation table 4'-5326-1 does. The buffer 4'-5327-1 and the computation table 4'-5328-1 conduct computation similar to that conducted by the buffer 4'-5325-1 and the computation table 4'-5326-1.

For outputs of the computation table 4'-5326-1 and the computation table 4'-5328-1 having the above described configuration, comparison processing similar to that of the above described RTS controller is conducted. Between the stuffing pattern controller 4'-61-1 and the RTS value controller 4'-53-1, similar feedback control is repeated. As a result, the difference between outputs of the tables becomes "0" or a fixed value, and the clocks of DS1 signals coincide with each other.

Figure 18:
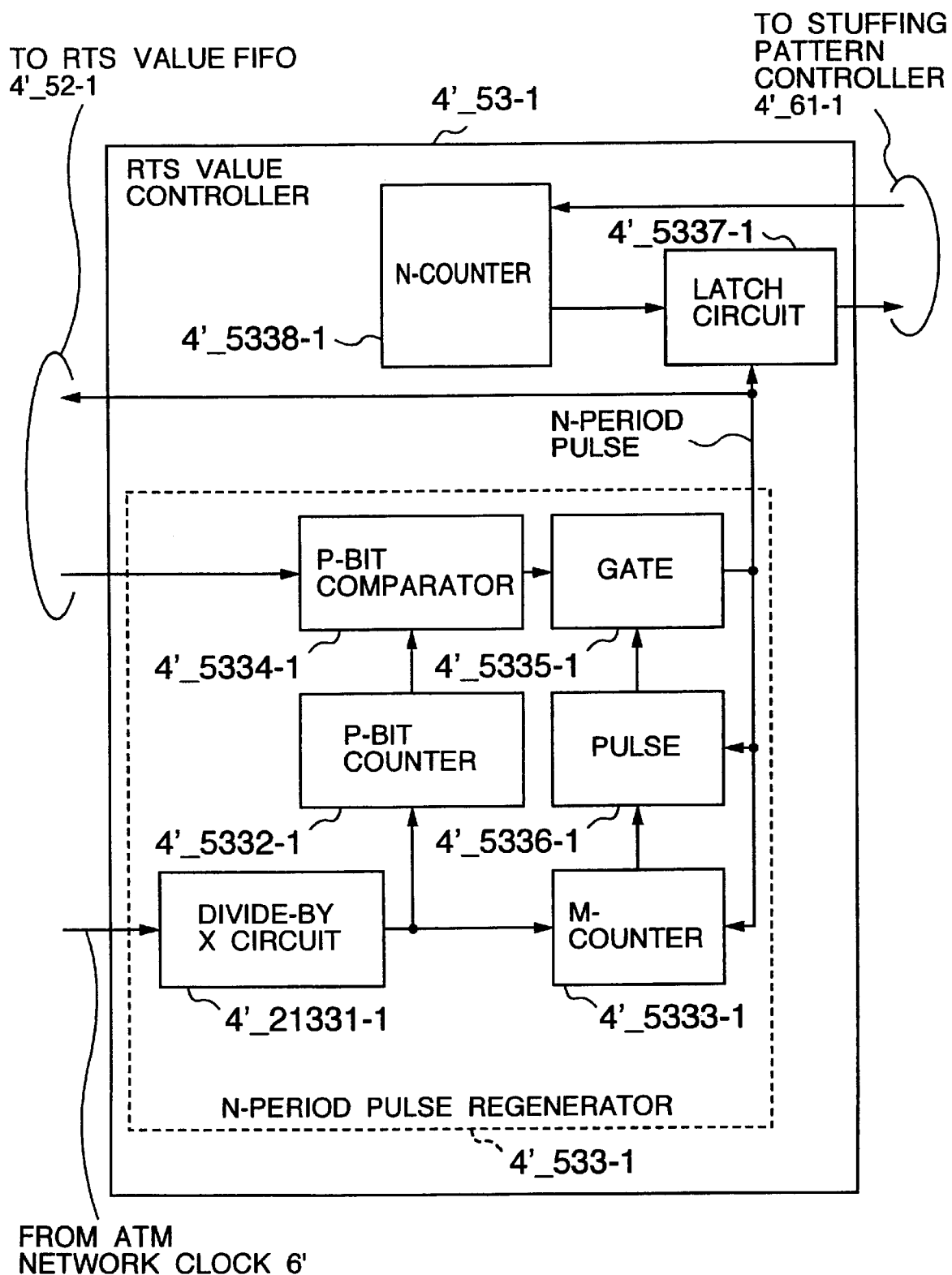
FIG. 18 is a block configuration diagram showing another different configuration of the RTS value controller included in the ATM cell dis-assembling apparatus according to the present invention.

FIG. 18 is also a block configuration diagram showing another configuration of the RTS value controller 4'-53-1. In the two preceding embodiments, the RTS is generated on the destination side. In this configuration, however, an N-period pulse regenerator 4'-533-1 obtained by improving a received RTS regeneration circuit described in U.S. Pat. No. 5,260,978 is used instead of the RTS generation circuit. In the N-period pulse regenerator 4'-533-1, a 3008 period of the DS1 signal is regenerated from the received RTS value. On the other hand, an N-counter 4'-5338-1 having a 3008-period counts DS1 signals read out by the ATM cell dis-assembling apparatus 4'. Its output value is latched at timing of the N-period pulse regenerator 4'-533-1. In the same way as the two preceding embodiments, therefore, synchronizing can be attained by repeating feedback control between the stuffing pattern controller 4'-61-1 and the RTS value controller 4'-53-1 so as to make the latched value equal to a fixed value.

Figure 19:
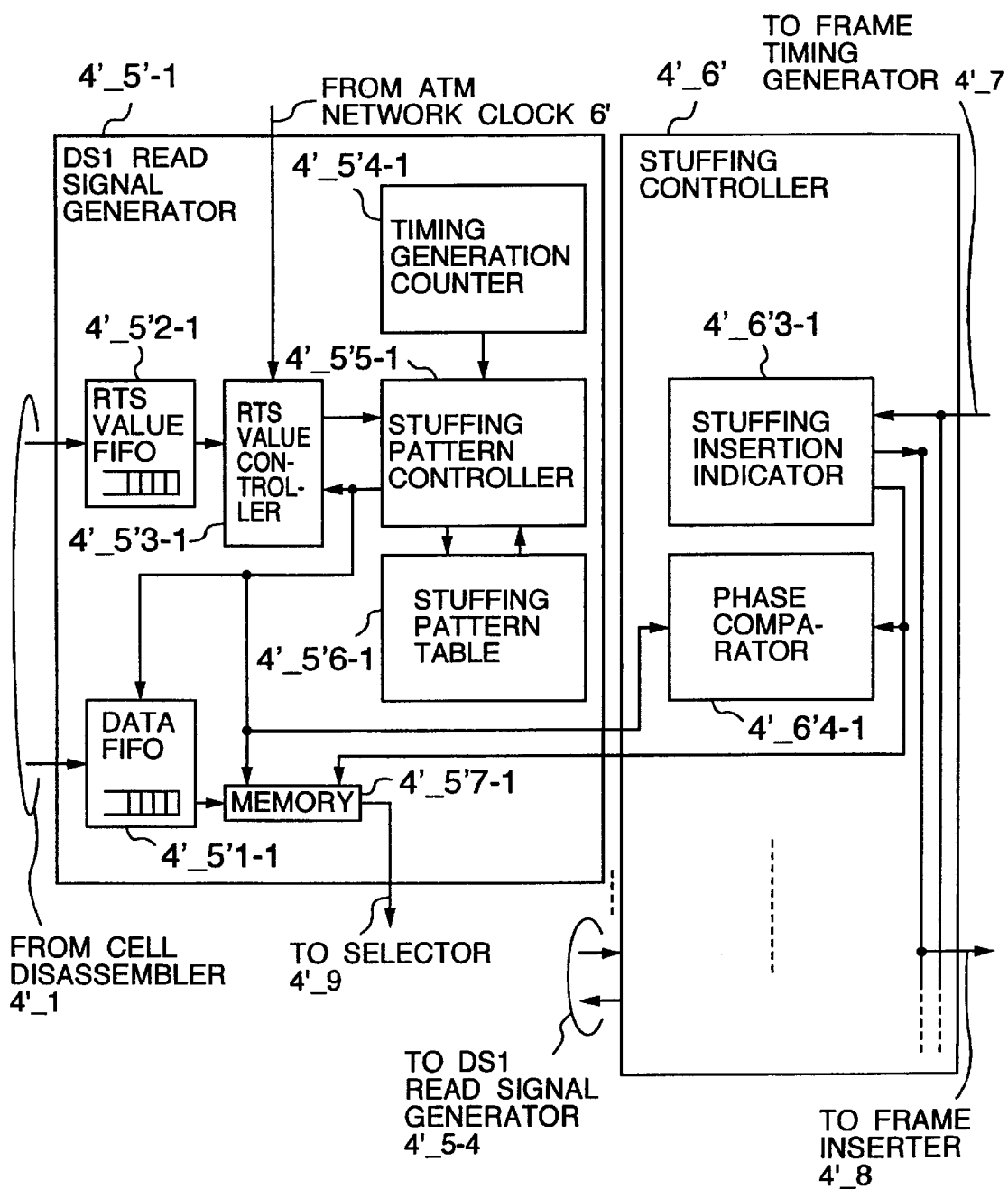
FIG. 19 is a block configuration diagram showing a different configuration of the DS1 readout controller and the stuffing controller included in the ATM cell dis-assembling apparatus according to the present invention.

FIG. 19 is a block configuration diagram showing different examples of the DS1 read signal generator 4'-5-1 and the stuffing controller. In FIG. 19, an existing stuffing controller 4'-6 is used. In other words, stuffing insertion control is effected on the basis of a result of comparison in a phase comparator 4'-6'4-1 in the same way as the conventional technique. Regardless of stuffing insertion of DS2 signal, data are read from a data FIFO 4'-5'1-1 and are written into a memory 4'-5'7-1. However, timing control of readout from the data FIFO 4'-5'1-1 is effected by using the RTS value. On the other hand, readout from a memory 4'-5'7-1 is conducted by a stuffing controller 4'-6'. According to the amount of data in the 4'-5'7-1, the stuffing controller 4'-6' conducts stuffing insertion control.

In FIG. 19, the data FIFO 4'-5'1-1, an RTS value FIFO 4'-5'2-1, an RTS value controller 4'-5'3-1, a stuffing pattern controller 4'-5'5-1, and a stuffing pattern table 4'-5'6-1 are identical to the data FIFO 4'-51-1, the RTS value FIFO 4'-52-1, the RTS value controller 4'-53-1, the stuffing pattern controller 4'-61-1, and the stuffing pattern table 4'-62-1 shown in FIG. 12. Although the stuffing pattern controller 4'-61-1 has an output extending to the frame inserter 4'-8, however, the stuffing pattern controller 4'-5'5-1 does not have such an output. In the same way as the periodic transmission of stuffing insertion positions to the stuffing pattern controller 4'-61-1 conducted by the frame timing generator 4'-7, a timing generation counter 4'-5'4-1 transmits periodically stuffing insertion positions to the stuffing pattern controller 4'-5'5-1. The period of the frame timing generator 4'-7 corresponds to one DS2 frame. However, the period of the timing generation counter 4'-5'4-1 may be different from it. In the same way as the readout control effected on the data FIFO 4'-51-1 by the stuffing pattern controller 4'-61-1, the stuffing pattern controller 4'-5'5-1 reads out data from the data FIFO 4'-5'1-1. The data thus read out are written into the memory 4'-5'7-1. From the memory 4'-5'7-1, data are read out under the control of a stuffing insertion indicator 4'-6'3-1. The amount of data in the memory 4'-5'7-1 is monitored by a phase comparator 4'-6'4-1. if the amount of data in the memory 4'-5'7-1 has become smaller than a certain threshold, the phase comparator 4'-6'4-1 transmits a stuffing request to the stuffing insertion indicator 4'-6'3-1. As a result, the stuffing insertion indicator 4'-6'3-1 controls readout of the memory 4'-5'7-1 to insert stuffing and effects stuffing insertion control of the frame inserter 4'-8.

When multiplexed DS1 signals are connected to an ATM network, the present invention makes it possible to lines of DS1 signals share the VCXO for clock smoothing at the time of destuffing, its control circuit, and the counter for implementing the SRTS which have been conventionally installed for each line. Therefore, it is pssible to provide an interface apparatus with respect to an ATM network which is not impaired in economic efficiency even if the degree of multiplexing of the communication network becomes large and which can operate at a high rate. To be more concrete, such a cell multiplexing apparatus and a cell demultiplexing apparatus for conducting cell multiplexing on signals of a large number of DS1 signal lines and transferring resultant signals to the ATM network can be provided. Furthermore, by applying these apparatuses to the ATM network, an economic network configuration can be realized.

What is claimed is:

1. An ATM demultiplexing apparatus for receiving a multiplexed ATM cell stream, converting said multiplexed ATM cell stream to a multiplexed signal having a second rate, and outputting said multiplexed signal, said ATM demultiplexing apparatus comprising:

an ATM cell disassembler which converts each ATM cell to a signal having a first rate and takes out each of said plurality of signals and a time stamp;

a memory which stores the signal and the time stamp supplied from said cell disassembler; and a multiplexing controller which conducts multiplexing processing on said plurality of signals so as to correspond to a signal kind and generates multiplexing control signals from said time stamp stored in said memory, adjusts a signal readout rate, and inserts a part of said multiplexing control signals and said plurality of signals in predetermined positions in a frame of said multiplexed signal, wherein a multiplexed signal obtained by multiplexing a plurality of signals read out from said memory is outputted, and wherein said multiplexing controller comprises:

a table which stores beforehand a plurality of patterns of said multiplexing control signals to be inserted in said multiplexed signal, a time stamp controller which generates a reference signal from the received time stamp and a clock of an ATM network, and a pattern controller which selects one out of the patterns stored in the table on the basis of the reference signal and thereby adjusting a readout rate of a memory, wherein the selected pattern and a plurality of signals are inserted in a frame of the multiplexed signal, and thereby synchronizing of each of a plurality of signals between a source node and destination node is assured.

2. A time stamp control circuit according to claim 1, comprising:

a time stamp generator which generates a time stamp from the clock of said ATM network and a number of bits of data read out from said memory; and a comparator which compares a received time stamp with output of said time stamp generator, wherein output of said comparator is outputted as the reference signal to be used by the pattern controller to adjust the data readout rate.

* * * * *